US009283687B2

(12) United States Patent
Yamanashi et al.

(10) Patent No.: US 9,283,687 B2
(45) Date of Patent: Mar. 15, 2016

(54) APPARATUS AND NON-TRANSITORY COMPUTER-READABLE MEDIUM

(71) Applicant: BROTHER KOGYO KABUSHIKI KAISHA, Nagoya-shi (JP)

(72) Inventors: Yoko Yamanashi, Konan (JP); Mika Matsushima, Ichinomiya (JP); Masayuki Hori, Gifu (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 14/288,072

(22) Filed: May 27, 2014

(65) Prior Publication Data

US 2014/0352511 A1 Dec. 4, 2014

(30) Foreign Application Priority Data

May 28, 2013 (JP) ................................. 2013-111868

(51) Int. Cl.
  *B41J 11/66* (2006.01)
  *B26D 5/00* (2006.01)
  *G06F 19/00* (2011.01)
  *G05B 19/409* (2006.01)

(52) U.S. Cl.
  CPC .............. *B26D 5/005* (2013.01); *G05B 19/409* (2013.01); *G05B 2219/37269* (2013.01); *G05B 2219/45038* (2013.01); *Y10T 83/175* (2015.04)

(58) Field of Classification Search
  CPC ........ B26D 5/00; B26D 5/005; G05B 19/409; G05B 2219/37269; G05B 2219/45038; B41J 11/66; G06F 19/00
  USPC ........................................................ 400/621
  See application file for complete search history.

(56) References Cited

U.S. PATENT DOCUMENTS

| 4,583,181 | A | * | 4/1986 | Gerber | ................... A41H 43/00 250/559.46 |
| 4,739,487 | A | * | 4/1988 | Bonnet | ................... A41H 3/007 353/28 |
| 5,258,917 | A | * | 11/1993 | Bruder | ................. B23K 26/032 348/125 |
| 5,663,885 | A | * | 9/1997 | Stahl | ........................ B26D 5/00 700/131 |
| 5,831,857 | A | | 11/1998 | Clarino et al. | |
| 6,293,677 | B1 | * | 9/2001 | Gallucci | .................. B26D 5/00 353/28 |

(Continued)

FOREIGN PATENT DOCUMENTS

| EP | 0950480 A2 | * | 10/1999 | ............... B26D 5/00 |
| JP | 2010264571 A | * | 11/2010 | ............... B26D 5/00 |
| JP | 2011005579 A | * | 1/2011 | ............... B26D 5/00 |
| JP | 2011125971 A | * | 6/2011 | ............... B26D 5/00 |
| JP | 2012136811 A | * | 7/2012 | ............... B26D 5/00 |
| JP | 2013-013977 A | | 1/2013 | |
| JP | 2013240838 A | * | 12/2013 | ............... B26D 5/00 |
| JP | 2014-231103 A | | 12/2014 | |

*Primary Examiner* — Nguyen Ha
(74) *Attorney, Agent, or Firm* — Fox Rothschild LLP

(57) ABSTRACT

An apparatus includes an information obtaining device configured to obtain information representing an optionally designated position on an object, a projector, a processing device, a pattern specifying device and a control device. The control device is configured to cause the apparatus to specify two designated positions on an object based on information obtained by the information obtaining device, to change a size of a specified pattern according to a distance between the specified designated positions, to cause the projector to project a marker onto the object in a size matched with the changed size of the pattern, based on the specified designated positions on the object, to determine a cutting or printing position of the pattern based on the specified designated positions on the object and to control the processing device to perform cutting or printing of the pattern in the changed size at the determined cutting or printing positions.

12 Claims, 12 Drawing Sheets

(56) References Cited

U.S. PATENT DOCUMENTS

| | | |
|---|---|---|
| 2002/0002416 A1 | 1/2002 | Herman, Jr. |
| 2004/0160429 A1 | 8/2004 | Blake et al. |
| 2005/0186010 A1 | 8/2005 | Shibata et al. |
| 2005/0256603 A1* | 11/2005 | Cloud ............... B26D 5/00 700/132 |
| 2007/0293975 A1 | 12/2007 | Hama |
| 2010/0103178 A1 | 4/2010 | Song et al. |
| 2011/0141067 A1* | 6/2011 | Misawa et al. ............ 345/179 |
| 2012/0253504 A1 | 10/2012 | Kawaguchi et al. |
| 2013/0177215 A1* | 7/2013 | Campbell ........ B26F 1/3813 382/111 |
| 2014/0352559 A1 | 12/2014 | Matsushima et al. |

* cited by examiner

| | R VALUE |
| COLOR DATA | G VALUE |
| | B VALUE |
| SIZE DATA | LONGITUDINAL |
| | TRANSVERSE |
| | (X1,Y1) |
| | (X2,Y2) |
| CUTTING LINE DATA | (X3,Y1) |
| | (X4,Y4) |
| | (X5,Y5) |

FIG.10

APPARATUS AND NON-TRANSITORY COMPUTER-READABLE MEDIUM

CROSS-REFERENCE TO RELATED APPLICATIONS

This application is based upon and claims the benefit or priority from the prior Japanese Patent Application No. 2013-111868 filed on May 28, 2013, the entire contents of which are incorporated herein by reference.

BACKGROUND

1. Technical Field

The present disclosure relates to an apparatus provided with a device cutting an object or printing on the object and a non-transitory computer-readable medium storing data of instructions for the apparatus.

2. Related Art

Cutting plotters have been conventionally known as an apparatus provided with a device cutting an object or printing on the object. One of the cutting plotters automatically executes a cutting process for the object including a sheet such as paper.

The cutting plotter is provided with a display. A user selects a desired one of a plurality of patterns displayed on the display. The sheet is attached to a holding sheet having an adhesive layer on a surface thereof. The holding sheet is inserted between a driving roller of a drive mechanism and a pinch roller both disposed one above the other. The cutting plotter moves the sheet in a first direction while holding both ends of the sheet between the rollers. The cutting plotter simultaneously moves a carriage with a cutting blade in a second direction perpendicular to the first direction, whereby the selected pattern is cut out of the sheet.

SUMMARY

In order that processing conditions such as a cutting position of the pattern on the sheet may be changed, the cutting plotter needs to read cutting data of the pattern to check and designate processing conditions. For example, when a cutting position as a processing condition of the pattern is changed, the user operates the cutting plotter while viewing the display. The pattern is displayed in a reduced size due to limitation in the size of the display. Accordingly, a changed cutting position cannot sometimes be understood correctly depending upon the pattern. Furthermore, a plurality of operation switches provided on the cutting plotter needs to be used for the change of processing conditions with the result that the operation becomes complicate.

Therefore, an object of the disclosure is to provide an apparatus which can easily check and set cutting or printing conditions for the object and a non-transitory computer-readable medium storing data of instructions for the apparatus.

The present disclosure provides an apparatus comprising an information obtaining device configured to obtain information representing an optionally designated position on an object, a projector configured to be capable of projecting a marker onto the object, a processing device configured to perform cutting or printing on the object, a pattern specifying device configured to specify a pattern to be cut out of the object or printed on the object and a control device. The control device is configured to cause the apparatus to specify two designated positions on the object based on the information obtained by the information obtaining device, to change a size of the specified pattern according to a distance between the specified designated positions, to cause the projector to project the marker onto the object in a size matched with the changed size of the pattern, based on the specified designated positons on the object, to determine a cutting position or a printing position of the pattern based on the specified designated positions on the object and to control the processing device to perform cutting or printing of the pattern in the changed size at the determined cutting or printing position.

The disclosure also provides a non-transitory computer-readable medium for an apparatus comprising an information obtaining device configured to obtain information representing an optionally designated position on an object, a projector configured to be capable of projecting a marker onto the object, a processing device configured to perform cutting or printing on the object, a pattern specifying device configured to specify a pattern to be cut out of the object or printed on the object and a control device. The medium stores computer-readable instructions, which, when executed by the control device, cause the apparatus to specify two designated positions on the object based on the information obtained by the information obtaining device, to change a size of the specified pattern according to a distance between the specified designated positions, to cause the projector to project the marker onto the object in a size matched with the changed size of the pattern, based on the specified designated positions on the object and to control the processing device to perform cutting or printing of the pattern in the changed size at the determined cutting or printing position.

BRIEF DESCRIPTION OF THE DRAWINGS

In the accompanying drawings:

FIG. 10 is a view explaining the structure of processing data;

DETAILED DESCRIPTION

Figure 1:
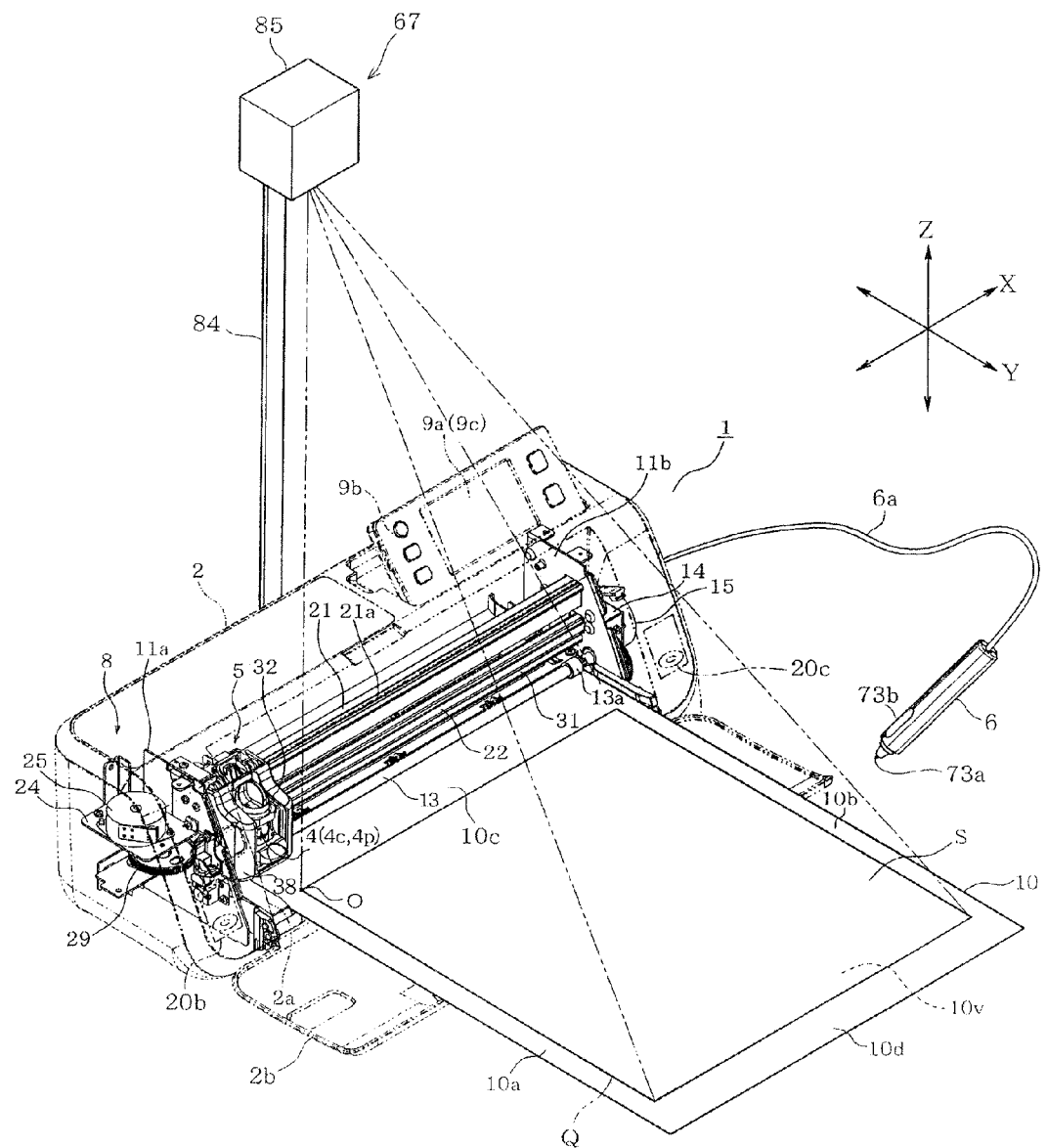
FIG. 1 is a perspective view of a processing apparatus, showing an entire structure thereof.

A first embodiment of an apparatus will be described with reference to FIGS. 1 to 15. Referring to FIG. 1, a processing apparatus 1 is shown and includes a body cover 2 serving as a housing, a platen 3 (see FIG. 2) provided in the body cover 2 and a processing head 5 on which a cartridge 4 is to be mounted. The processing apparatus 1 further includes a holding sheet 10 for holding an object S to be processed.

A plurality of cutter cartridges 4c and a plurality of pen cartridges 4p are prepared as the cartridge 4 in the processing apparatus 1. One of the cartridges 4c and 4p is selectively attached to a cartridge holder 32 of the processing head 5 as will be described later. All the cartridges 4c and 4p include respective cases 50 having substantially the same shape (see FIGS. 4A and 4B). All the cartridges 4c and 4p will be hereinafter referred to as "cartridge 4" for the sake of simplicity.

The processing apparatus 1 is provided with an ultrasonic digital pen 6 which is used to designate a position on the object S held on the holding sheet 10. The ultrasonic pen 6 is configured to transmit ultrasonic waves. A connector (designated by reference numeral 70 in FIG. 9) is provided on a side of the body cover 2. The ultrasonic pen 6 has a cable 6a which is connected to the connector 70. The body cover 2 has a front formed with receivers 20c and 20b located on right and left ends thereof respectively. The receivers 20b and 20c are configured to receive the ultrasonic waves transmitted by the ultrasonic pen 6. The ultrasonic pen 6 and the receivers 20b and 20c will be described in detail later.

The body cover 2 is formed into the shape of a horizontally long rectangular box. The body cover 2 has a front formed with an opening 2a. A front cover 2b is mounted on the front of the body cover 2 to open and close the opening 2a. The holding sheet 10 holding the object S is set onto the platen 3 while the front opening 2a is open or the cartridge 4 is attached to or detached from the cartridge holder 32.

The processing apparatus 1 includes a transfer mechanism 7 which transfers the holding sheet 10 set on the platen 3 in a predetermined transfer direction (the Y direction). The processing apparatus 1 also includes a head moving mechanism 8 which moves the processing head 5 in a direction intersecting with the transfer direction of the holding sheet 10 (for example, the X direction perpendicular to the transfer direction). In the following description, the direction in which the holding sheet 10 is transferred by the transfer mechanism 7 will be referred to as "front-rear direction". That is, the front-rear direction is the Y direction and the right-left direction perpendicular to the Y direction is the X direction.

A liquid-crystal color display 9a and an operation device 9b including various operation switches are mounted on a right upper surface of the body cover 2. The display 9a is capable of full color display and is configured to display various patterns, conditions for cutting and printing (processing conditions), necessary messages to the user, and the like. A touch panel 9c is placed on a display surface side of the display 9a. The operation device 9b or the touch panel 9c is operated by the user when various input contents are entered. A touch panel 9c is placed on a display surface side of the display 9a. When operating the operation switches of the operation device 9b or the touch panel 9c, the user can designate an object to be displayed on a screen of the display 9a, select various patterns, set various parameters, and the like.

The operation device 9b and the touch panel 9c serve as a pattern specifying device for specifying a pattern to be cut or printed.

Figure 2:
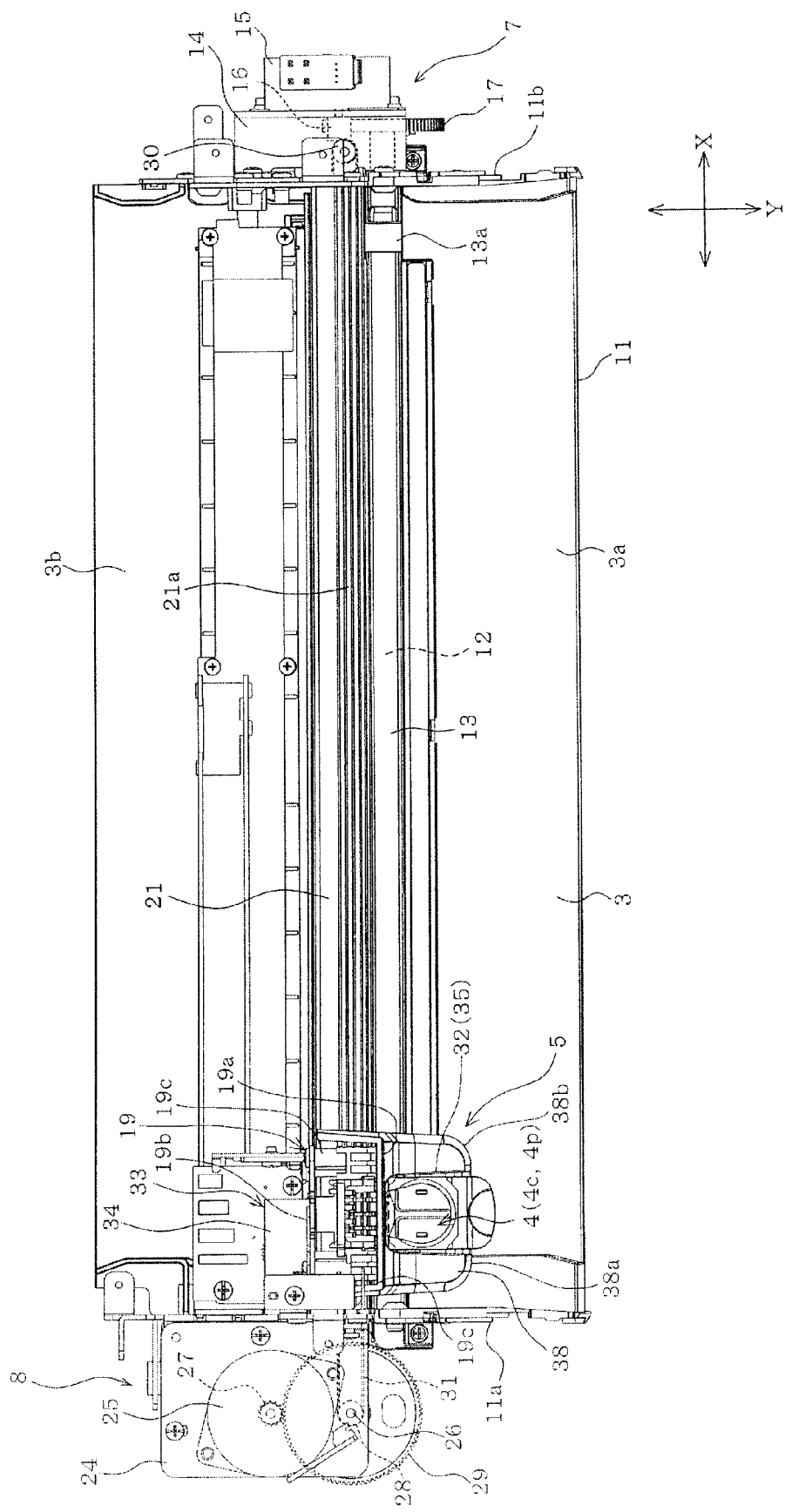
FIG. 2 is a plan view of the processing apparatus, showing the inner structure thereof.

The platen 3 receives the underside of the holding sheet 10 when the object S is processed. The platen 3 includes a front platen 3a and a rear platen 3b and has a horizontal upper surface as shown in FIG. 2. The holding sheet 10 holding the object S is transferred while being placed on the platen 3. The holding sheet 10 is made of a synthetic resin material, for example and formed into a rectangular shape. An adhesive layer 10v (see FIGS. 1 and 14) is provided on an upper side of the holding sheet 10. The adhesive layer 10v is formed by applying an adhesive agent to an inner region of the holding sheet 10 except for peripheral edges 10a to 10d. The holding sheet 10 serves as a holding member which holds the object S attached to the adhesive layer 10v. The adhesive layer 10v has an adhesive force which is set so that the object S is immovably held reliably in the cutting or printing process by the use of the cartridge 4 of the cutter 44 or the printing and so that the object S can be easily removed after the processing. The transfer mechanism 7 and the head moving mechanism 8 are constructed into a relative movement unit which moves the holding sheet 10 holding the object S in the Y direction and the processing head 5 in the X direction relative to each other.

Firstly, the transfer mechanism 7 transfers the holding sheet 10 on the upper surface side of the platen 3 freely in the Y direction. A frame 11 is enclosed in the body cover 2 as shown in FIGS. 1 and 2. The frame 11 includes right and left sidewalls 11b and 11a which are located at right and left sides of the platen 3 so as to face each other, respectively. A driving roller 12 and a pinch roller 13 are mounted on both sidewalls 11a and 11b so as to be located in a space between the front and rear platens 3a and 3b. The driving roller 12 and the pinch roller 13 extend in the right-left direction and lined in the up-down direction. The pinch roller 13 is located above the driving roller 12.

The driving roller 12 has an upper end which is substantially level with the upper surface of the platen 3 and right and left ends mounted on the right and left sidewalls 11b and 11a respectively so that the driving roller 12 is rotatable. The right end of the driving roller 12 extends rightward through the right sidewall 11b as shown in FIG. 2. A driven gear 17 having a large diameter is secured to a right end of the driving roller 12. A mounting frame 14 is fixed to art outer surface of the right sidewall 11b. A Y-axis motor 15 comprised of a stepping motor, for example is mounted on the mounting frame 14. The Y-axis motor 15 has an output shaft to which is fixed a driving gear 16 having a small diameter and is to be brought into mesh engagement with the driven gear 17.

The pinch roller 13 has right and left ends mounted on the right and left sidewalls 11b and 11a respectively so that the pinch roller 13 is rotatable and slightly displaceable in the up-down direction. Two springs (not shown) are mounted on the outer surfaces of the right and left sidewalls 11b and 11a to normally bias the right and left ends of the pinch roller 13 downward. Accordingly, the pinch roller 13 is normally biased downward (to the driving roller 12 side) by the springs. Two rollers 13a each having a slightly large diameter are mounted on the pinch roller 13 so as to be located near both ends thereof respectively. Only the right roller 13a is shown in FIGS. 1 and 2.

The right and left edges 10b and 10a of the holding sheet 10 are thus held between the driving roller 12 and the rollers 13a of the pinch roller 13. Upon normal or reverse rotation of the Y-axis motor 15, the rotation is transmitted via the gears 16 and 17 to the driving roller 12, whereby the holding sheet 10 is transferred rearward or forward. The transfer mechanism 7 is thus constituted by the driving roller 12, the pinch roller 13, the Y-axis motor 15 and the gears 16 and 17 serving as a reduction mechanism.

The head moving mechanism 8 serves to move the carriage 19 of the processing head 5 freely in the X direction. More specifically, as shown in FIGS. 1 and 2, a pair of guide rails 21 and 22 are fixed to the right and left sidewalls 11b and 11a so as to be located slightly rear above the pinch roller 13. The guide rails 21 and 22 extend in the right-left direction substantially in parallel to the pinch roller 13. Guide grooves are formed in an upper surface of the guide rail 21 and an underside of the guide rail 22 so as to extend between the right and left ends although only the guide groove 21a of the upper surface is shown.

Furthermore, the carriage 19 has a pair of protrusions engaging the guide grooves 21a respectively although the grooves are not shown. The protrusions are formed on the upper and lower sides so as to hold the guide grooves 21a therebetween in the up-down direction. Thus, the carriage 13 is supported by the engagement of the protrusions and the guide grooves 21a so as to be slidable on the guide rails 21 and 22 in the right-left direction.

A horizontal mounting frame 24 is fixed to the outer surface of the left sidewall 11a so as to be located near the rear of the left sidewall 11a at the outer surface side, as shown in FIGS. 1 and 2. An X-axis motor 25 is mounted on a rear part of the left mounting frame 24 to a downward direction. Furthermore, a vertically extending pulley shaft 26 (see FIG. 2) is mounted on the mounting frame 24. The X-axis lector 25 is comprised of a stepping motor, for example and has an output shaft to which a driving gear 27 having a small diameter is fixed. A timing pulley 28 and a driven gear 29 having a large diameter are rotatably mounted on the pulley shaft 26. The timing pulley 28 and the driven gear 29 are configured to be rotated together.

On the other hand, a timing pulley 30 is mounted on the right mounting frame 14 so as to be rotatable about an axis extending in the up-down direction. An endless timing belt 31 horizontally extends between the timing pulleys 30 and 28 in the right-left direction. The timing belt 31 has a midway part joined to a mounting part (not shown) of the carriage 19.

Upon normal or reverse rotation of the X-axis motor 25, the rotation is transmitted via the gears 27 and 29 and the timing pulley 28 to the timing belt 31, whereby the processing head 5 is moved leftward or rightward. Thus, the carriage 19 is moved freely in the right-left direction perpendicular to the direction in which the object S is conveyed. The head moving mechanism 8 is thus constituted by the guide rails 21 and 22, the X-axis motor 25, the gears 27 and 29 serving as a reduction mechanism, the timing pulleys 28 and 30, the timing belt 31 and the like.

The processing head 5 includes an up-down drive mechanism 33 and a cartridge holder 32 disposed in the rear and in front of the carriage 19 as shown in FIG. 2. The up-down drive mechanism 33 is configured to drive the cartridge holder 32 in the up-down direction (the Z direction) together with the cartridge 4. The carriage 19 includes front and rear walls 19a and 19b and upper and lower arms 19c and 19d connecting the walls 19a and 19b. Thus, the carriage 19 is shaped so as to surround the front and rear sides and upper and lower sides of the guide rails 21 and 22. A Z-axis motor 34 (see FIG. 2) is mounted on the rear wall 19b so that an axis thereof is directed frontward. The Z-axis motor 34 is comprised of a stepping motor, for example. A transmission mechanism (not shown) is provided between the Z-axis motor 34 and the cartridge holder 32. The transmission mechanism reduces a rotational speed of the Z-axis motor 34 and converts rotation of the Z-axis motor 34 to up-down movement of the cartridge holder 32, transmitting the up-down movement. The transmitting mechanism and the Z-axis motor 34 constitute the up-down drive mechanism 33.

Upon normal or reverse rotation of the Z-axis motor 34, the rotation is converted via the transmission mechanism to the up-down movement, whereby the cartridge holder 32 is moved upward or downward together with the cartridge 4. As a result, the cartridge holder 32 is moved together with the cartridge 4 between a lowered position and a raised position (see two-dot chain line in FIG. 3). When located at the lowered position, the cartridge 4 of the cartridge holder 32 carries out cutting by a cutter 44 or printing by a pen 45 as shown in FIGS. 4A and 4B. When the cartridge 4 of the cartridge holder 32 is located at the raised position, the blade edge 46 or the pen tip 48 is spaced away from the object S by a predetermined distance.

When the cutter cartridge 4c is attached to the cartridge holder 32 and is located at the lowered position, the blade edge 46 penetrates the object S. On the other hand, when the pen cartridge 4p is attached to the cartridge holder 32 and is located at the lowered position, the pen tip 48 abuts on the object S. Pressure of the blade edge 46 and pressure of the pen tip 48 will be set to be suitable for the cutting and the printing based on an amount of rotation of the Z-axis motor 34, respectively.

Figure 3:
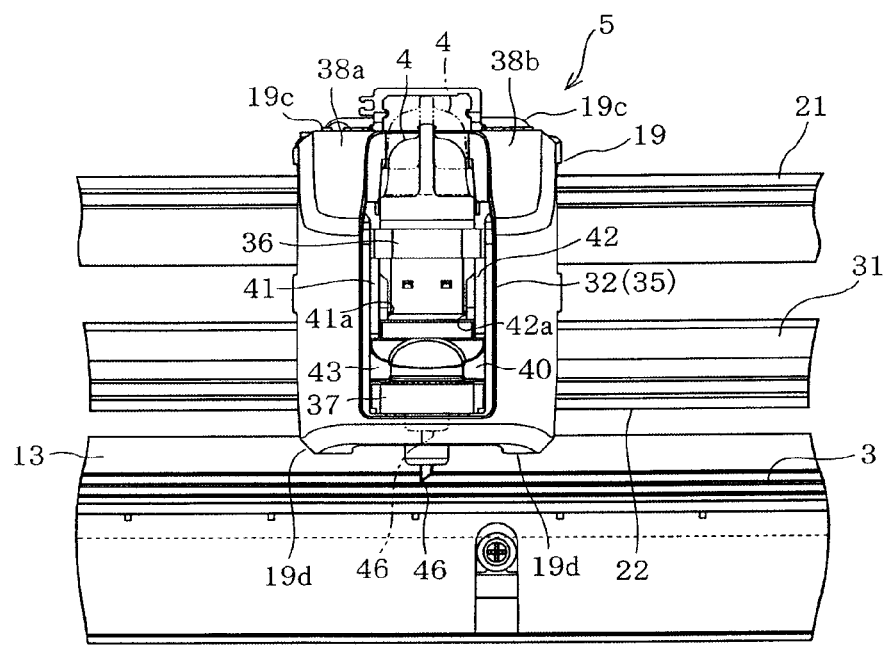
FIG. 3 is a front view of a processing head and its periphery.
Figures 4A, 4B:
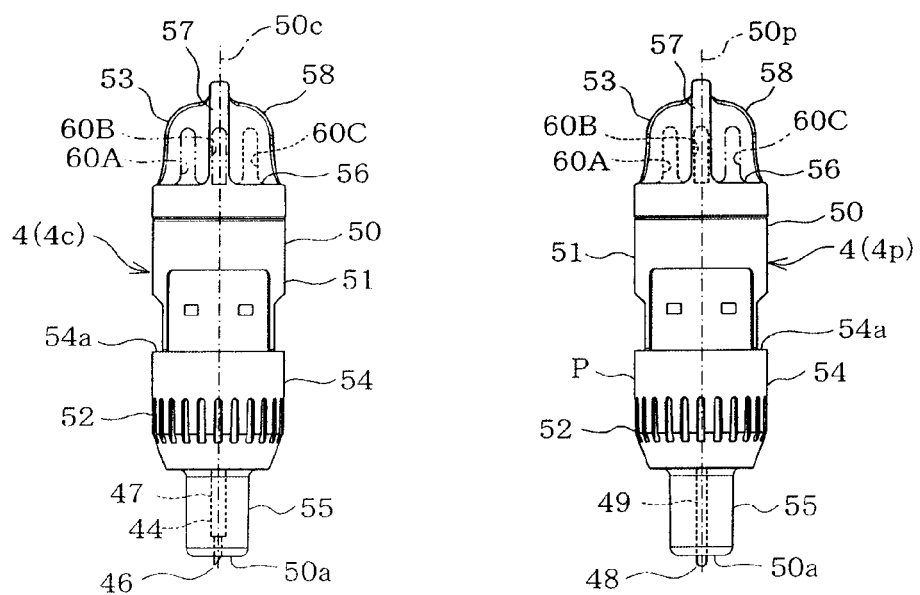
FIGS. 4A and 4B are front views of examples of a cutter cartridge and a pen cartridge respectively.
Figure 5:
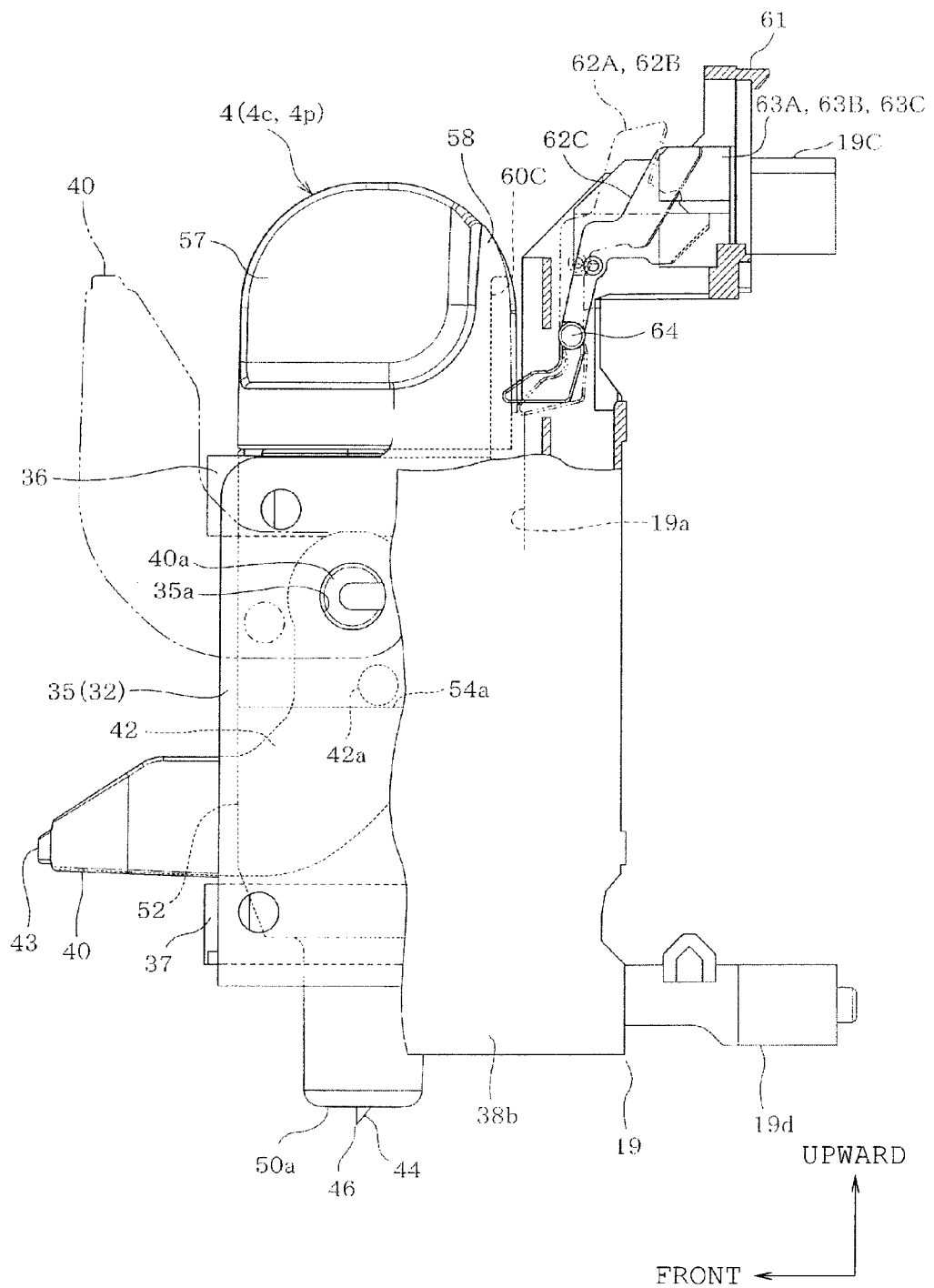
FIG. 5 is a right side view of a cartridge holder and its vicinity with a cover member being partially broken in the stats where the cartridge is attached.

The cartridge holder 32 includes a holder frame 35 and upper and lower holders 36 and 37 both fixed to the holder frame 35 as shown in FIGS. 2, 3 and 5. More specifically, a cover member 38 is provided on the front wall 19a of the carriage 19 so as to cover right and left sides of the front wall 19a from front. The holder frame 35 serving as a movable part is disposed between a left projection part 38a and a right projection 38b of the cover member 38. The holder frame 35 is formed into a C-shape (see FIG. 2) and has a top, underside and front all of which are open. The upper and lower holders 36 and 37 are attached so that the cartridge 4 is inserted through the both holders from above. The upper and lower holders 36 and 37 are each formed into a frame shape housed in the holder frame 35.

The holder frame 35 is provided with a lever member 40 located between the upper and the lower holders 36 and 37 as shown in FIGS. 3 and 5. The lever member 40 has a pair of right and left arms 42 and 41 and an operating portion 43 which is provided so as to connect between distal end sides of the arms 41 and 42. The lever member 60 has a proximal end formed with pivot portions 40a and 40b located at outer surface sides of the arms 41 and 42 respectively. Only the right pivot portion 40a is shown in FIG. 5. The holder frame 35 has right and left sidewalls formed with circular holes respectively. Only the right circular hole 35a is shown. The pivot portions 40a and 40b are inserted through circular holes 35a respectively. The arms 41 and 42 include respective inner surface sides provided with small columnar engagement portions 41a and 42a (see FIGS. 3 and 5). The engagement portions 41a and 42a are formed so as to be engageable with engaged portions 54a of the cartridge 4 respectively.

As a result, the lever member 40 is swung about the pivot portions 40a serving as a center of swinging motion so as to be switchable between an open position shown by alternate long and two short dashes line in FIG. 5 and a fixed position shown by solid line in FIG. 5. As shown in FIG. 5, the engagement portions 41a and 42a engage the engaged portions 54a respectively when the lever member 40 is located at the fixed position. As the result of the engagement, the cartridge 4 is fixed to the lower holder 37 (the cartridge holder 32). On the other hand, when operated so as to be pulled frontward, the lever member 40 is swung from the fixed position to the open position. With this swing, the engagement portions 41a and 42a depart from the respective engaged portions 54a, whereby the lever member 40 is released from the fixed state.

The cartridge 4 which is detachably attached to the cartridge holder 32 will now be described. FIGS. 4A and 4B exemplify cartridges 4c and 4p of the cutter 44 and the pen 45 respectively. As shown, the cartridge 4c of the cutter C and the cartridge 4p of the pen P include the same case 50 and are selectively attached to the cartridge holder 32. More specifically, the case 50 includes a case body 51, the cap 52 and a knob 53. The cap 52 and the knob 53 are provided on one end and the other end of the case body 51 respectively. The case body 51 is formed into a cylindrical shape and extends in the up-down direction.

The cap 52 includes a larger-diameter portion 54 and a smaller-diameter portion 55 and is accordingly formed into the shape of a stepped bottomed cylindrical container. The larger-diameter portion 54 is fitted with a lower end of the case body 51. The larger-diameter portion 54 has an upper end serving as an engaged portion 54a which abuts on the engagement portions 41a and 42a of the lever member 40. The larger-diameter portion 54 has a lower end which is fitted with the lower holder 37 of the cartridge holder 32. The cap 52 has an underside 50a formed into a flat shape. The underside 50a has a through hole (not shown) through which the blade edge 46 of the cutter 44 or the pen tip 48 is inserted. The knob 53 has a cover plate 56, a knob plate 57 and a rear plate 58 both provided on an upper part of the cover plate 56. The cover plate 56 is fixed to an upper end of the case body 51. The knob plate 57 is mounted on a central part of the cover plate 56 in the right-left direction so as to be directed vertically.

The cartridge 4c shown in FIG. 4A includes the cutter 44 serving as a cutting unit (a processing unit). The cutter 44 has a proximal end or a cutter shaft 47 and a distal end (a lower end) or the blade edge 46, both of which are formed integrally with the cutter 44. The cutter shaft 47 is formed into a round bar shape and is housed in the case 50. The blade of the cutter 44 is formed into a substantially triangular shape tilted relative to the object S although not shown in detail in the drawings. Furthermore, bearings are provided in the case body 51 to support the cutter shaft 47 so that the cutter shaft 47 is rotatable about a central axis 50c thereof. The blade edge 46 protrudes from the underside 50a of the cap 52. The cartridge 4c is constructed so that a central axis 50c of the cutter shaft 47 corresponds with a central axis of the cap 52.

The cartridge 4p shown in FIG. 4B is a printing instrument (a processing unit) and has a distal end or the pen tip 48 from which ink is caused to seep. An ink tank (not shown) is provided in the case body 51 to supply ink to a pen tip member 49. The pen tip 48 protrudes from the underside 50a of the cap 52. The cartridge 4p is constructed so that a central axis 50p of the pen tip 48 corresponds with a central axis of the cap 52.

Any one of three grooves 60A to 60C is formed in the rear plate 58 of the knob 53 so that the rear plate 58 is a concavo-convex portion, as shown in FIGS. 4A and 4B. The grooves 60A to 60C have different concavo-convex patterns according to types of the cartridges 4. More specifically, for example, the cutting cartridge 4c or the printing cartridge 4p can be discriminated based on presence or absence of the groove 60C at the right end of the rear plate 58, as shown in FIGS. 4A and 4B. In other words, for example, the cartridges 4c and 4p as shown in respective FIGS. 4A and 4B differ from each other in the presence or absence of the groove 60C at the right end of the rear plate 58. The groove 60C can discriminate between the cutting cartridge 4c and the printing cartridge 4p. Furthermore, for example, the color type of the pen 45 can be discriminated based on presence or absence of the grooves 60A and 60B of the cartridge 4p. In order that the type of the cartridge 4 may be discriminated, the number of grooves of the concavo-convex portion may be changed depending upon a color type of the cartridge 4, for example.

The carriage 19 is provided with a detection unit which is located at an upper side facing the rear plate 58 of the cartridge 4, as shown in FIG. 5. The detection unit may include, for example, three contacts 62A to 62C and three type detection sensors 63A to 63C all provided on a base plate holder 61.

The type detection sensors 63A to 63B are mounted on a substrate of the base plate holder 61 so as to be arranged from side to side. The type detection sensors 63A to 63C are comprised of optical sensors (photointerrupters). The contacts 62A to 62C are formed into the shape of a plate extending over the side of the type detection sensors 63A to 63C. The contacts 62A to 62C have lengthwise middle portions formed with shafts 64 respectively. The base plate holder 61 is provided with bearings (not shown) swingably supporting the shafts 64 respectively, whereby the contacts 62A to 62C are supported by the respective bearings so as to be lined in the direction of plate thickness. Three extension coil springs (not shown) extend between upper portions of the contacts 62A to 62C and the substrate holder 61 respectively. The contacts 62A to 62C are biased by the extension coil springs in a direction such that the upper portions of contacts 62A to 62C are tilted toward the type detection sensors 63A to 63C respectively. In other words, the biasing forces of the extension coil springs act in a direction such that lower ends of the contacts 62A to 62C come into contact with the rear plate 58 of the knob 53.

For example, when the cartridge 4c of the cutter 44 is attached to the cartridge holder 32, the lower ends of the contacts 62A and 62B come into contact with the rear plate 58, thereby swinging. With the swinging, the upper ends of the contacts 62A and 62B are departed from the type detection sensors 63A and 63B respectively (see two-dot chain line in FIG. 5). On the other hand, the lower end of the other contact 62C remains tilted toward the groove 60C of the rear plate 58. Accordingly, the upper end of the contact 62C is fitted at the type detection sensor 63C side.

The cutter cartridge 4c is attached to the cartridge holder 32 in cutting the object S. In this case, the control circuit 71 identifies the type of the cutter cartridge 4c, based on detection signals of the contacts 62A to 62C generated by the type detection sensors 63A to 63C respectively. The control circuit 71 then controls the up-down drive mechanism 33 to move the cutter cartridge 4c to the lowered position and sets the blade edge 46 to the above-mentioned cutter pressure. In this case, the blade edge 46 penetrates the object S on the holding sheet 10 to be put slightly into the holding sheet 10. In this state, the holding sheet 10 and the cutter cartridge 4c are moved in the X and Y directions relative to each other by the transfer mechanism 7 and the head moving mechanism 8, respectively. The cutting of the object S is executed by this relative movement.

On the other band, when the pen cartridge 4p is attached to the cartridge holder 32 in printing the object S, the control circuit 71 identifies the type of the pen cartridge 4p, based on detection signals of the contacts 62A to 62C generated by the type detection sensors 63A to 63C respectively. The control circuit 71 then controls the up-down drive mechanism 33 to move the pen cartridge 4p to the lowered position and sets the pen tip 48 to the above-mentioned pen pressure. In this case, the pen tip 48 penetrates the object S. In this state, the holding sheet 10 and the pen cartridge 4p are moved in the X and Y directions relative to each other by the transfer mechanism 7 and the head moving mechanism 8, respectively. The printing of the object S is executed by this relative movement.

A sheet sensor 66 (see FIG. 9) is provided on the underside of the carriage 19 for detecting the holding sheet 10 set on the platen 3 (the Y direction position of the sheet 10). A detection signal generated by the sheet sensor 66 is supplied to the control circuit 71. An X-Y coordinate system with a left corner of the adhesive layer 10v serving as an origin O is set in the processing apparatus 1, as shown in FIG. 1. The above-described relative movement of the holding sheet 10 (the object S) and the processing head 5 (the cartridge 4) is carried out on the basis of the X-Y coordinate system.

In the processing apparatus 1 of the example, a position on the object S to which the cutting or printing operation is applied is represented on the object S by a projector 67 as shown in FIG. 1. Furthermore, any position on the object S is designated by the ultrasonic pen 6. The designated position is detected by the receivers 20b and 20c thereby to be set as the processing position.

The ultrasonic pen 6, the receivers 20b and 20c and the projector 67 will be described in detail with reference to FIGS. 6 and 9. A cable 6a has two ends, one of which is connected to the ultrasonic pen 6 and the other of which is connected to a connector 70. Thus, the ultrasonic pen 6 is supplied with electric power from the processing apparatus 1 side when connected via the cable 6a to the connector 70 (see FIG. 9). On the other hand, the ultrasonic pen 6 supplies an electrical signal via the connecting cable 6a to the cutting apparatus 1.

Figure 6:
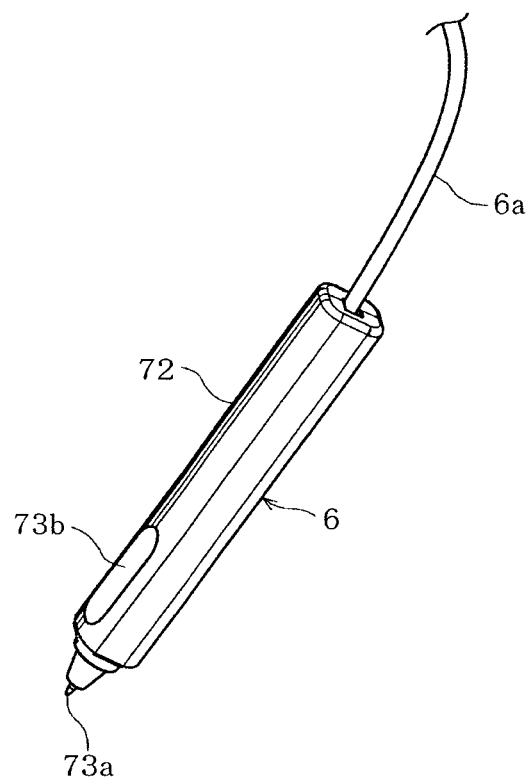
FIG. 6 is a perspective view of an ultrasonic digital pen.

The ultrasonic pen 6 includes a pen body 72 and the pen tip 73a as shown in FIG. 6. The pen body 72 is formed into a bar shape and has a distal end. The pen tip 73a which is tapered and has a pointed distal end is provided at the distal end side (the lower end side in FIG. 6) of the pen body 72. The pen tip 73a projects so as to be capable of penetrating the pen body 72 in the lengthwise direction with the result that the pen tip 73a can be caused to abut with the object and inserted into the pen body 72. A biasing member is provided in the pen body 72 for biasing the pen tip 73a in a direction such that the pen tip 73a protrudes from the pen body 72. When released from the protruding force, the biasing force of the biasing member returns the pen tip 73a to the original protruding position. Furthermore, a button 73b is provided on a part of the pen body 72 located nearer the pen tip 73a. While holding the ultrasonic pen 6 with his/her hand, the user can push the button 73b with his/her finger.

Figure 9:
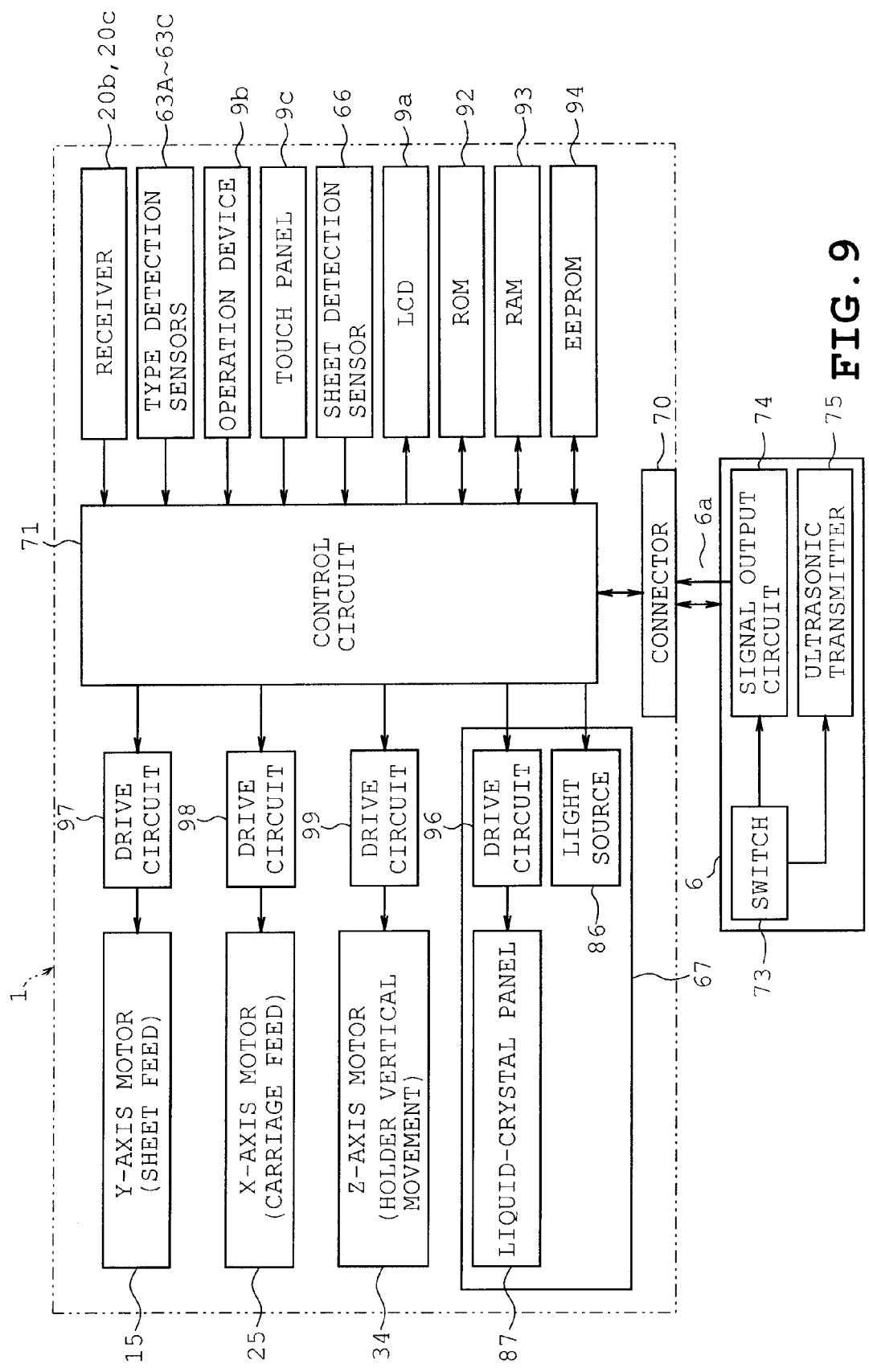
FIG. 9 is a schematic block diagram showing an electrical arrangement of the processing apparatus.

The ultrasonic pen 6 includes an ultrasonic transmitter 75, a signal output circuit 74 and a switch 73 in the pen body 72, as shown in FIG. 9. The ultrasonic transmitter 75 is disposed in proximity to the pen tip 73a and configured to transmit ultrasonic waves from the distal end side of the pen body 72 when actuated. The signal output circuit 74 transfers the signal via the cable 6a to the processing apparatus 1. The switch 73 switches output states of the signal output circuit 74 and the ultrasonic transmitter 75 according to the position of the pen tip 73a or an operation of the button 73b. More specifically, when the ultrasonic pen 6 is not used, the pen tip 7a is located at the protrusion position and the switch 73 is in the OFF state. When the switch 73 is off, the ultrasonic transmitter 75 transmits no ultrasonic waves, whereby the signal output circuit 74 supplies no electrical signal. However, when the user presses the pen tip 73a against any position on the object S, the pen tip 73a enters the pen body 72, whereby the switch 73 is switched to the ON state. Alternatively, when the user pushes the button 73 while the pen tip 73a is located at any position on the object S instead of pressing the pen tip 73a, the switch 73 is switched to the ON state in response to operation of the button 73b. When the switch 73 is switched to the ON state, the ultrasonic transmitter 75 transmits ultrasonic waves and simultaneously, the signal output circuit 74 transfers the signal via the cable 6a to the processing apparatus 1.

The ultrasonic transmitter 75 is disposed in proximity to the pen tip 73a side. Accordingly, the position of the pen tip 73a can be regarded as a source of transmission. Furthermore, the cable 6a serves to supply electrical power to the ultrasonic pen 6 as well as to transmit the signals from the signal output circuit 74. Consequently, the ultrasonic pen 6 need not be provided with a battery cell with the result that the weight of the processing apparatus 1 can be reduced. The ultrasonic pen 6 may be provided with no button 73b. Furthermore, the ultrasonic pen 6 may include the pen tip 73a formed integrally with the pen body 72 and the button 73b may be independently provided.

Figure 8A:
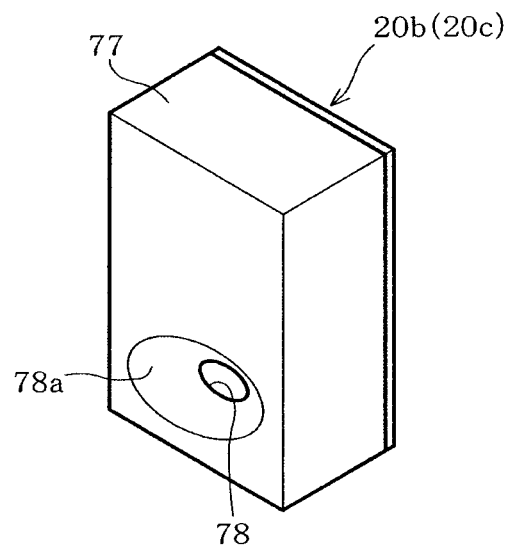
FIGS. 8A, 8B and 8C are an enlarged perspective view, an enlarged front view of a receiver and a longitudinal section taken along line VIIIc-VIIIc in FIG. 8B, respectively.
Figure 8B:
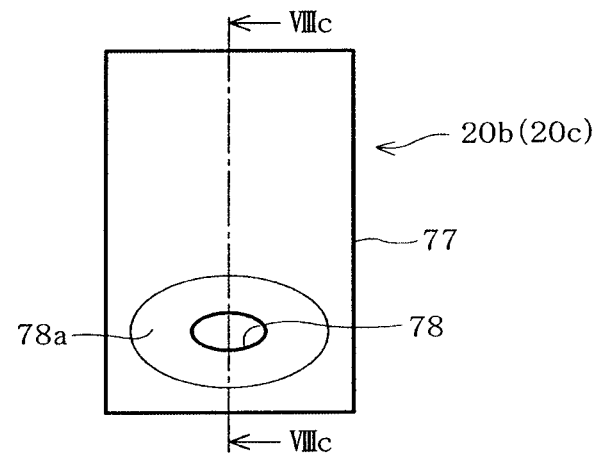
Figure 8C:
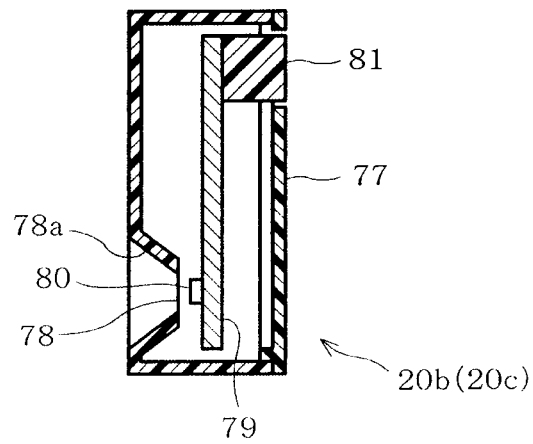

The receivers 20b and 20c serve as detection equipment for detecting (receiving) ultrasonic waves transmitted from the ultrasonic pen 6. Since the paired right and left receivers 20c and 20b have the same configuration, one receiver 20b will be described with reference to FIGS. 8A to 8C. A case 77 constituting an outer envelope of the receiver 20b is formed into the shape of a vertically slight long hollow rectangular parallelepiped. The case 77 has a lower front formed with a centrally located opening 78. The opening 78 is formed into the shape of an ellipse which is long in the right-left direction in a front view of FIG. 8B. The case 77 has an inverted tapered surface 78a (an inclined surface) which is located around the opening 78 and spread from the rear toward the front thereof. A substrate 79 is housed in the case 77 of the receiver 20b as shown in FIG. 8C. A microphone 80 is mounted on a front of the substrate 79 so as to be located at a position facing the opening 78. A connector 81 is mounted on an upper rear of the substrate 79.

The receiver 20b is disposed on a left end of the body cover 2 with the opening 78 being directed frontward (with the connector 81 being directed rearward). The connector 81 is connected to the control circuit 71. On the other hand, the receiver 20c is disposed on a right end of the body cover 2 in the same manner as the receiver 20b. A connector 81 of the receiver 20c is also connected to the control circuit 71. The receivers 20b and 20c are installed so that the microphone 80 (the opening 78) is located slightly above the object S. Thus, when the ultrasonic pen 6 transmits ultrasonic waves, the receivers 20b and 20c receive the ultrasonic waves at the front side of the body cover 2. As long as the ultrasonic waves can be received, the positions of the receivers 20b and 20c should not be limited to those described above and may be appropriately changed.

The control circuit 71 further serves as a position specifying unit which specifies the aforesaid designated position on the object S, based on the ultrasonic wave detection signals by the receivers 20b and 20c and the transmission signal transmitted from the ultrasonic pen 6 via the cable 6a. The designated position is specified by a world coordinate system representing a whole space and can be shown by the aforesaid X-Y coordinate system in the processing apparatus 1. The world coordinate system in the embodiment is a three-dimensional coordinate system and has, as the origin O, the left corner of the adhesive layer 10v of the holding sheet 10 in the same manner as the two-dimensional coordinate system of the processing apparatus 1.

Figure 7:
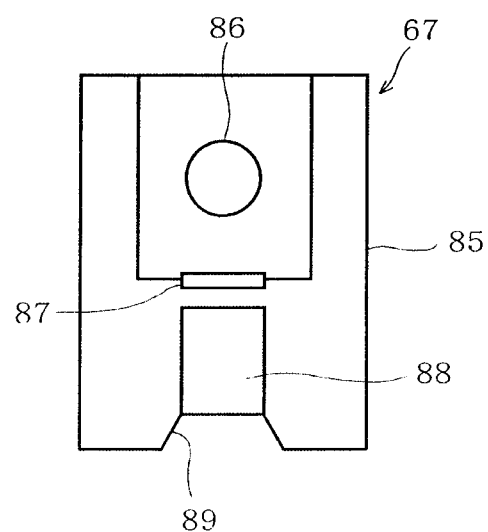
FIG. 7 is a schematic diagram of an inner structure of a projector.

The projector 67 projects an image representing the designated position onto the object S. The projector 67 is housed in a rectangular box-shaped casing 85, for example as shown in FIGS. 1 and 7. A support member 84 is mounted on the rear of the body cover 2 so as to stand upward. The casing 85 is supported by the support member 84 so as to be located above the processing apparatus 1. Thus, the support member 84 supports the casing 85 so that the casing 85 is spaced away from the object S by a predetermined distance and so that an optical axis of projection light is oriented diagonally forward end downward toward the central part of the holding sheet 10. The projector 67 includes an adjusting unit (not shown) which adjusts a size and a focal point of an image to be projected. As a result, the projector 67 projects an image onto a predetermined projection range Q (see FIG. 1) according to a region of the object S (the adhesive layer 10v of the holding sheet 10).

More specifically, the projector 67 includes a light source 86, a liquid-crystal panel 87 and an imaging lens 88 in the casing 85, as shown in FIG. 7. The light source 86 comprises a discharge lamp such as a metal halide lamp, for example. The liquid-crystal panel 87 modulates light incident from the light source 86, forming image light to be projected. The imaging lens 88 causes the image light formed by the liquid-crystal panel 87 to be focused onto the projection range Q on the object S through a projection opening 89 formed in a lower part of the casing 85. As a result, an image based on the image data is projected onto the object S (see a marker 100 in FIG. 13B).

In this case, a process of compensating distortion of the image is executed by the projector 67 since the image is projected onto the object S diagonally from above. The image data of the marker 100 is related to the coordinate system of the processing apparatus 1 and accordingly, the coordinate position of the image data can be corrected on the basis of the aforesaid designated position. Although an image projected from the projector 67 is colored by a plurality of colors, the image may be monochromatic or may be adjusted into a color according to that of the object S.

The arrangement of the control system of the processing apparatus 1 will be described with reference to FIG. 9. The control circuit (control device) 71 controlling the whole processing apparatus 1 is mainly composed of a computer (CPU). A ROM 92, a RAM 93 and an EEPROM 94 are connected to the control circuit 71. The ROM 92 stores a cutting control program for controlling a cutting operation and a printing control program for controlling a printing operation. The ROM 92 also stores a processing program for executing a main process which will be described later, a display control program for controlling a displaying operation of the display 9a and the like. The EEPROM 94 stores cutting data for cutting a plurality of types of patterns, printing data for printing a plurality of types of patterns, various parameters for generating image data of a marker serving as a projected image, and the like.

The control circuit 71 is supplied with signals generated by the sheet detection sensor 66, the type detection sensors 63A to 63C, the receivers 20b and 20c, and the like. The signals generated by the receivers 20b and 20c are amplified by an amplifier circuit (a drive circuit not shown) of the microphone 80 mounted on the substrate 79. The control circuit 71 is connected to the display 9a, the touch panel 9c and various operation switches of the operation device 9b. While viewing displayed contents on the display 9a, the user operates the operation switches of the operation device 9b and the touch panel 9c, thereby selecting a desired pattern or setting parameters. The control circuit 71 is also connected to the light source 86 of the projector 67 and drive circuits 96 to 99 driving the liquid-crystal panel 87, the Y-axis motor 15, the X-axis motor 25 and the Z-axis motor 34 respectively. Based on cutting data or printing data, the control circuit 71 controls the Y-axis motor 15, the X-axis motor 25, the Z-axis motor 34 and the like, so that a cutting or printing operation is automatically executed for the object S on the holding sheet 10.

On the other hand, the switch 73 of the ultrasonic pen 6 is electrically connected to the signal output circuit 74 and the ultrasonic generator 75. The signal output circuit 74 is connected via the cable 6a and the connector 70 to the control circuit 71. Accordingly, when the switch 73 is turned on, the signal output circuit 74 transmits a signal via the cable 6a to the control circuit 71 side and the ultrasonic transmitter 75 simultaneously transmits ultrasonic waves.

Figure 13A:
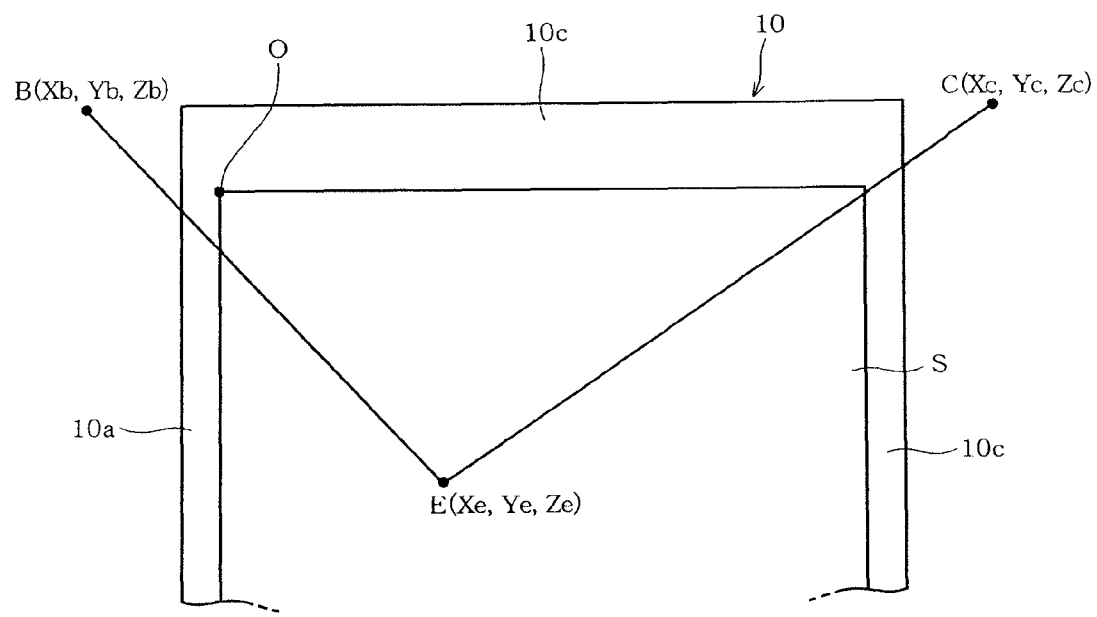
FIGS. 13A and 13B are a view showing the relationship between a designated position on the object and a position of the receiver, and a marker projected on the object, respectively.

The following will describe a manner of specifying the designated position on the object S designated by the ultrasonic pen 6, with reference to FIGS. 1 and 13A. The object S is set on the processing apparatus 1 while being held by the holding sheet 10. The rear corners of the holding sheet 10 are held between the rollers 13a of the pinch roller 13 and the driving roller 12, as shown in FIG. 1. As a result, the holding sheet 10 holding the object S is positioned at predetermined frontward position on the upper surface of the platen 3 so as to be substantially horizontal. The user presses the pen tip 73a of the ultrasonic pen 6 against the object S on the holding sheet 10 or operates the button 73b thereby to designate any position.

In this case, the designated position is assumed to be in the region of the adhesive layer 10v where the object S is positioned, namely, within the projection range Q of the projector 67. Furthermore, a position of the ultrasonic transmitter 75 serving as a transmission source of ultrasonic waves is specified as the designated position. More specifically, the pen tip 73a and the ultrasonic transmitter 75 are disposed in proximity to each other. Accordingly, the position of the pen tip 73a pressed against the object S can be regarded as the designated position.

Furthermore, the designated position is specified by three-dimensional coordinate information (X coordinate, Y coordinate, Z coordinate) of the world coordinate system. The origin (0, 0, 0) of the world coordinate system is the left corner of the adhesive layer 10v of the holding sheet 10. The Z coordinate is 0 on the upper surface of the holding sheet 10. Assume now that coordinate E (Xe, Ye, Ze) represents the designated position as shown in FIG. 13A. Also assume that coordinate B (Xb, Yb, Zb) represents the position of the left microphone 20b and that coordinate C (Xc, Yc, Zc) represents the position of the right microphone 20c. The ROM 92 stores values Xb, Yb and Zb of the coordinate B of the receiver 20b and values Xc, Yc and Zc of the coordinate C of the receiver 20c. The Z coordinates Zb and Zc of the receivers 20b and 20c indicate the heights of the microphones 80 with respect to the holding sheet 10 respectively.

The coordinate E will be referred to as "designated coordinate E" and a distance between the designated coordinate E and the coordinate B will be referred to as "distance EB." A distance between the designated coordinate E and the coordinate C will be referred to as "distance EC." In this case, the distances EB and EC can be represented by the values of coordinate E and B on the basis of the Pythagorean theorem. More specifically, the distance EB is represented by the following equation (1) using the values of the coordinates E and B and the distance EC is represented by the following equation (2) using the values of the coordinates E and C:

$$(Xb-Xe)^2+(Yb-Ye)^2+(Zb-Ze)^2=(EB)^2 \quad (1)$$

$$(Xc-Xe)^2+(Yc-Ye)^2+(Zc-Ze)^2=(EC)^2 \quad (2)$$

Equation (1) is identical with an equation of a spherical surface which has a central point represented by the coordinate B and a radius represented by the distance EB and passes the designated coordinate E. Equation (2) is similarly identical with an equation of a spherical surface which has a central point represented by the coordinate C and a radius represented by the distance EC and passes the designated coordinate E.

A transmission time Tb designates a time required from transmission of ultrasonic waves from the ultrasonic pen 6 designating the designated coordinate E to detection of the ultrasonic waves by the left receiver 20b. A transmission time Tc designates a time required from transmission of ultrasonic waves from the ultrasonic pen 6 designating the designated coordinate E to defection of the ultrasonic wave by the right receiver 20c. In this case, the distances EB and EC can be obtained by the following equations (3) and (4) with V designating the ultrasonic speed (sound speed in the measurement space):

$$EB = V \times Tb \quad (3)$$

$$EC = V \times Tc \quad (4)$$

An equation (5) is obtained when the equation (3) is substituted into the equation (1), and an equation (6) is obtained when the equation (4) is substituted into the equation (2):

$$(Xb-Xe)^2 + (Yb-Ye)^2 + (Zb-Ze)^2 = (V \times Tb)^2 \quad (5)$$

$$(Xc-Xe)^2 + (Yc-Ye)^2 + (Zc-Ze)^2 = (V \times Tc)^2 \quad (6)$$

The values of "Xb," "Yb" and "Zb" of coordinate B in equation (5) are known, and the values of "Xc," "Yc" and "Zc" of coordinate C in equation (6) are also known. The sound speed V is further known. The ROM 92 stores these values. The transmission times Tb and Tc are calculated from the differences between the timing of ultrasonic transmission from the ultrasonic transmitter 75 and the detection timings of ultrasonic waves by the receivers 20b and 20c respectively. The timing of ultrasonic transmission from the ultrasonic transmitter 75 will be referred to as "transmission timing T1" in the following. Furthermore, the detection timings of ultrasonic waves by the receivers 20b and 20c will be referred to as "detection timing T2b" and "detection timing T2c" respectively.

The object S is set on the platen 3 of the processing apparatus 1 while held by the holding sheet 10. Since the object S is so thin that the thickness thereof is ignorable, the Z coordinate of the upper surface of the object S can be zero (Ze=0). Thus, the transmission times Tb and Tc are obtained from the measured timings T1, T2b and T2c. Eased on the obtained transmission times Tb and Tc and the known values Xb, Yb, Zb, Xc, Yc, Zc and V, simultaneous equations of equations (5) and (6) are solved with the result that the designated coordinate E (Xe, Ye, Ze (=0)) is obtained. In this case, the coordinate E is specified in consideration of the directionality of the receivers 20b and 20c (the directionality of the microphone 8).

Figure 11:
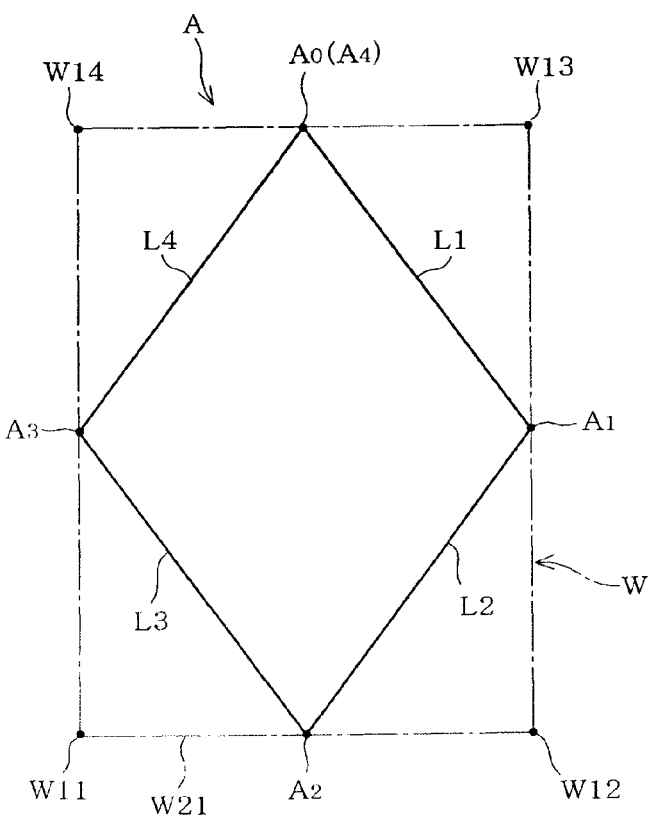
FIG. 11 illustrates an example of pattern to be cut or printed based on the processing data.

The cutting data will be described with an example in which a pattern A as shown in FIG. 11 is cut out of the object S held on the holding sheet 10. More specifically, a rhombic pattern A is to be cut from the object S by the cutter 44. In this case, the cutting data includes color data, size data and cutting line data all as shown in FIG. 10, and display data. For example, the color data represented by RGB values is related with the display data. Accordingly, an image displayed on the display 9a and an image of marker projected from the projector 67 can be represented as color images on the basis of display data of the pattern A. The size data is the value indicative of the horizontal and vertical size of the pattern A and represents a cutting region corresponding to a configuration of the pattern A. For example, a cutting region of the rhombic pattern A in FIG. 11 is represented by the size of a rectangular frame W encompassing the pattern A while being tangent to the pattern A at apexes $A_0$ to $A_3$. The cutting line data is data of X-Y coordinate values of apexes of a cutting line composed of a plurality of line segments and is defined by the X-Y coordinate system of the processing apparatus 1.

More specifically, the cutting line of the pattern. A includes four line segments L1 to L4 and is a closed quadrangle with a cutting start point and a cutting end point corresponding with each other, as shown in FIG. 11. The cutting line data has a first coordinate value (X1, X1), a second coordinate value (X2, Y2), a third coordinate value (X3, Y3), a fourth coordinate value (X4, Y4) and a fifth coordinate value (X5, Y5) all corresponding to the cutting start point $A_0$, the apex $A_1$, the apex $A_2$, the apex $A_3$ and cutting end point $A_4$ respectively. These coordinate values have as a coordinate origin a left upper point W14 of the rectangular frame W as shown in FIG. 11, for example. A cutting operation is executed on the basis of the cutting line data on the assumption that the coordinate origin corresponds to the origin O of the holding sheet 10 (see FIG. 14).

When the pattern A is cut by the processing apparatus 1, the cutter 44 is relatively moved to the X-Y coordinate of cutting start point $A_0$ by the transfer mechanism 7 and the head moving mechanism 8. The blade edge 46 of the cutter 44 is then caused to penetrate through the cutting start point $A_0$ part of the object S by the up-down drive mechanism 33. In this state, the blade edge 46 is relatively moved by the transfer mechanism 7 and the head moving mechanism 8 so as to connect linearly among the apex $A_1$, apex $A_2$, apex $A_3$ and cutting end point $A_4$ sequentially. Thus, the line segments L1, L2, L3 and L4 are cut sequentially continuously with the result that an outline of the pattern A or rhombus is cut out.

The printing data will be described in the same manner as described with an exemplified case where the pattern A is printed on the object S. The printing data includes printing line data, color data, size data and display data. More specifically, as shown in FIG. 11, the pattern A is printed on the object S by the pen cartridge 4p, whereby the rhombus composed of the line segments L1 to L4 is drawn. The printing line data of pattern A includes line segment data corresponding to the line segments L1 to L4 respectively. The line segment data have coordinate value data in which the start and end points of the line segments L1 to L4 are indicated by X-Y coordinates in the same manner as in the cutting line data. The color data represents the color type of the pen cartridge 4p and is set to be related with the display data. The size data represents the size of the printing region by a minimum rectangular frame W in which pattern A is inscribed, in the same manner as the aforesaid rectangular frame W of the cutting region.

In the printing, the pen cartridge 4p of the relevant type is displayed on the display 9a on the basis of the color data. The user attaches the pen cartridge 4p to the cartridge holder 32 while viewing displayed contents on the display 9a. The control circuit 71 executes the above-described printing operation and relatively moves the pen cartridge 4p based on the printing line data, whereby the line segments L1 to L4 are plotted on the object S. As a result, the pattern A is printed in the color of the color data.

The EEPROM 94 stores cutting data and printing data of various patterns including the aforesaid pattern A. The cutting data and the printing data will be collectively called "processing data" hereinafter. Additionally, the cutting operation and the printing operation both controlled by the control circuit 71 will be collectively called "processing operation" hereinafter.

Figure 12:
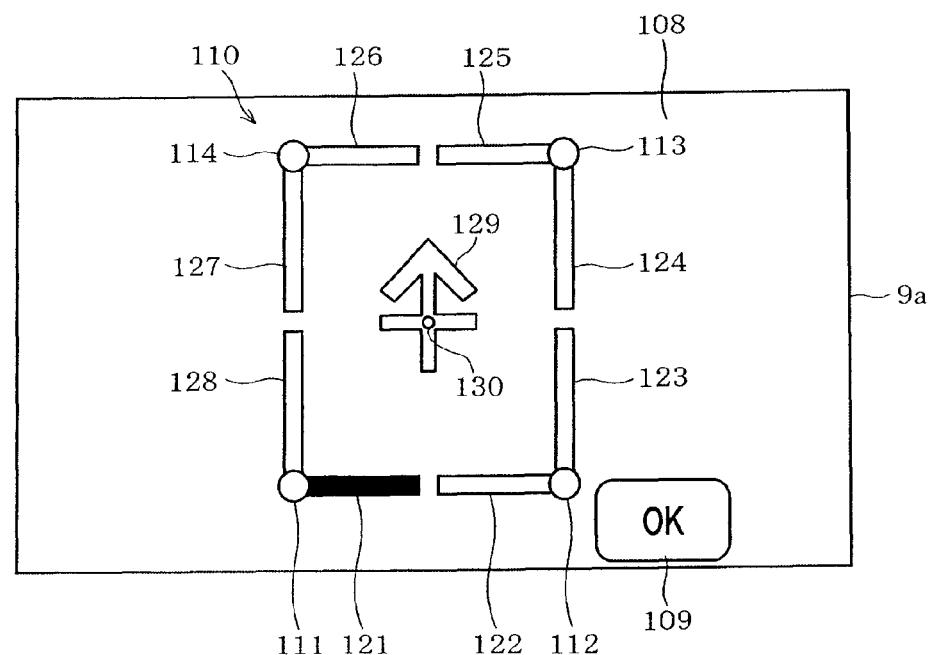
FIG. 12 is an example of a view showing a processing condition setting screen.

The processing data includes data of coordinate values specified by the X-Y coordinate system of the processing apparatus 1 as described above. The coordinate value data is set so as to be related to the world coordinate system. Accordingly, the processing conditions of the processing data of the selected pattern can be set and changed with the use of the ultrasonic pen 6 on the basis of the designated coordinate represented by the world coordinate system in the embodiment. FIG. 12 shows a processing condition setting screen 108 displayed on the display 9a when the processing conditions are set. The processing condition setting screen 108 is provided with a figure 110 to set processing conditions of a pattern and an OK key 109.

The figure 110 is composed of a plurality of figure elements (figure group) in order that a process position, angle and size of a pattern may be set as processing conditions, as shown in FIG. 12. More specifically, the figure group 110 includes four point blocks 111 to 114, eight side blocks 121 to 128, an arrow block 129 and a center point block 130. The point blocks 111 to 114 at four corners of the figure block 110 correspond to the apexes of the rectangular frame W of the pattern respectively. The side blocks 121 to 128 correspond to the sides between the apexes. The arrow block 129 represents an angle of the pattern. The center point block 130 corresponds to a center point of the rectangular frame W which is the processing region. When the figure group 110 is displayed, the lateral direction and the longitudinal direction in the screen 108 correspond to the aforesaid X direction and Y direction respectively.

In using the ultrasonic pen 6, any one of the blocks 111 to 114 and 121 to 130 belonging to the figure group 110 is touched with a finger or a dedicated touch pen (not shown), so that the touched block is selected. For example, when the side block 121 is selected, the outlined side block 121 is changed to the blacked-out side block 121. Thus, the control circuit 71 recognizes as to which one of the processing position, angle and size of the pattern the type of the processing condition is or a portion serving as a reference to set the processing condition.

More specifically, when the processing position of the pattern A is changed, one point block is selected from the point blocks 111 to 130 including the center point block 130 of figure group 110. As a result, the control circuit 71 processes the designated coordinate to be thereafter supplied by the ultrasonic pen 6 as information designating the processing position of the pattern A. Accordingly, for example, assume that any position on the object S is designated with the ultrasonic pen 6 after selection of the left upper point block 114 in FIG. 12. In this case, the processing position of the pattern A is changed from an initial position (the left upper corner in FIG. 14) corresponding with the origin of the holding sheet 10 to a position where the point W14 is set to the designated position.

When an angle of the pattern A is changed, one of the side blocks 121 to 128 and arrow block 129 is selected as a reference. As a result, the control circuit 71 processes two designated coordinates supplied thereto by the operation of the ultrasonic pen 6 as first and second designated positions for setting an angle of the pattern A. For example, assume that two positions (see reference numerals 201 and 202 in FIG. 13B) on the object S are designated with the ultrasonic pen 6 after selection of the side block 121 in FIG. 12. In this case, the direction of the pattern A is changed while a rotational angle corresponds to an angle made by the side W21 (see FIG. 11) of the rectangular frame W corresponding to the side block 121 and an imaginary line passing the first and second designated positions 201 and 202.

The aforesaid imaginary line is shown by an arrow of vector obtained by moving a point from the first designated position 201 to the second designated position 202. Furthermore, assume now that the arrow block 129 is selected for the change in the angle of the pattern A without selection of the above-described side blocks 121 to 128. In this case, the first and second designated positions 201 and 202 are designated by the ultrasonic pen 6 although the designation is not shown in detail. As the result of this designation, the angle of the pattern A can be changed so that the arrow of the block 129 corresponds with the arrow of vector obtained by moving the point from the first designated position 201 to the second designated position 202.

Figure 13B:
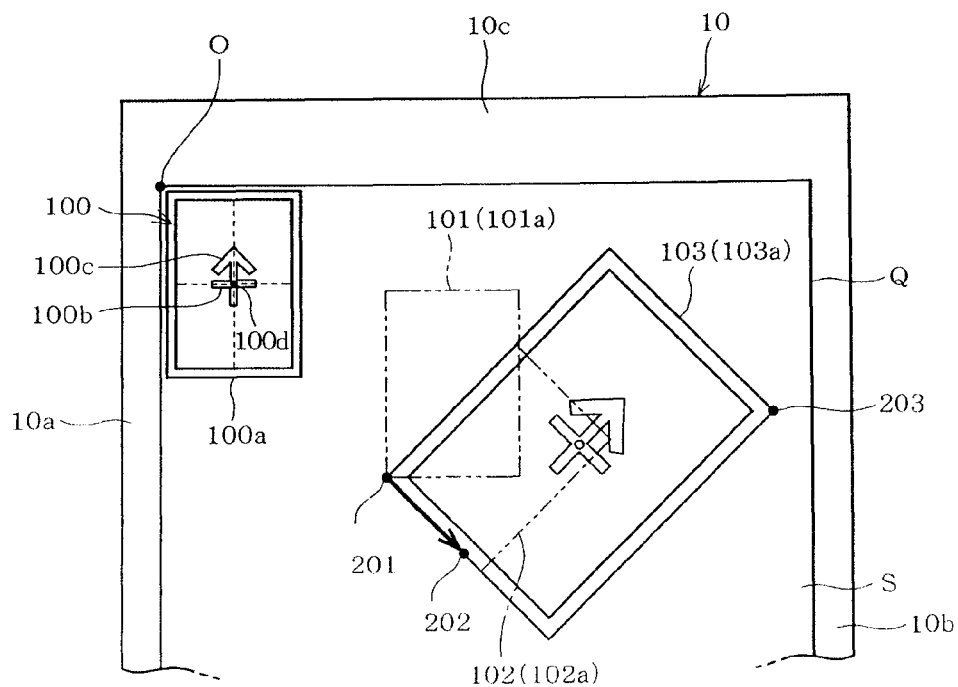
Figure 14:
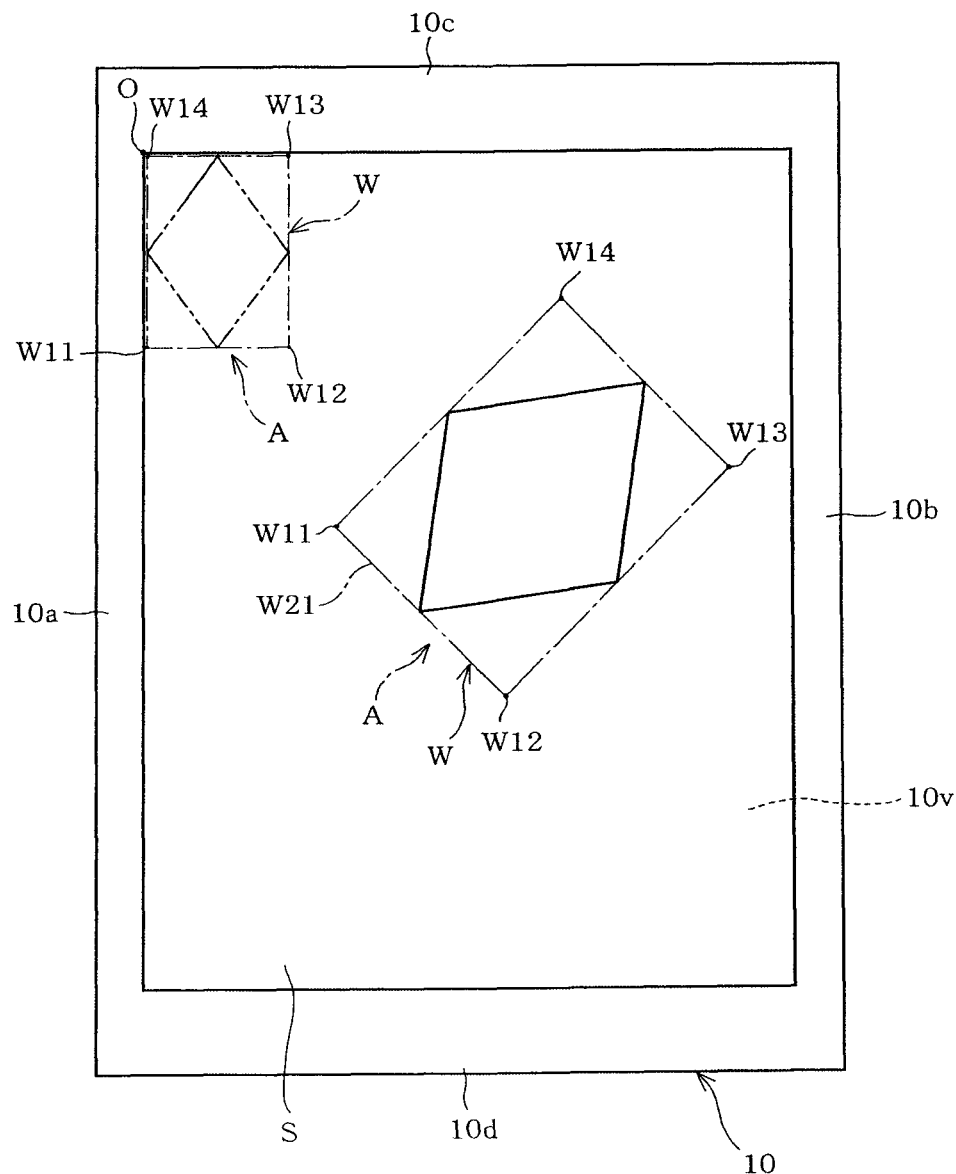
FIG. 14 illustrates a pattern before change in processing conditions and a pattern after change in the processing conditions.
Figure 15:
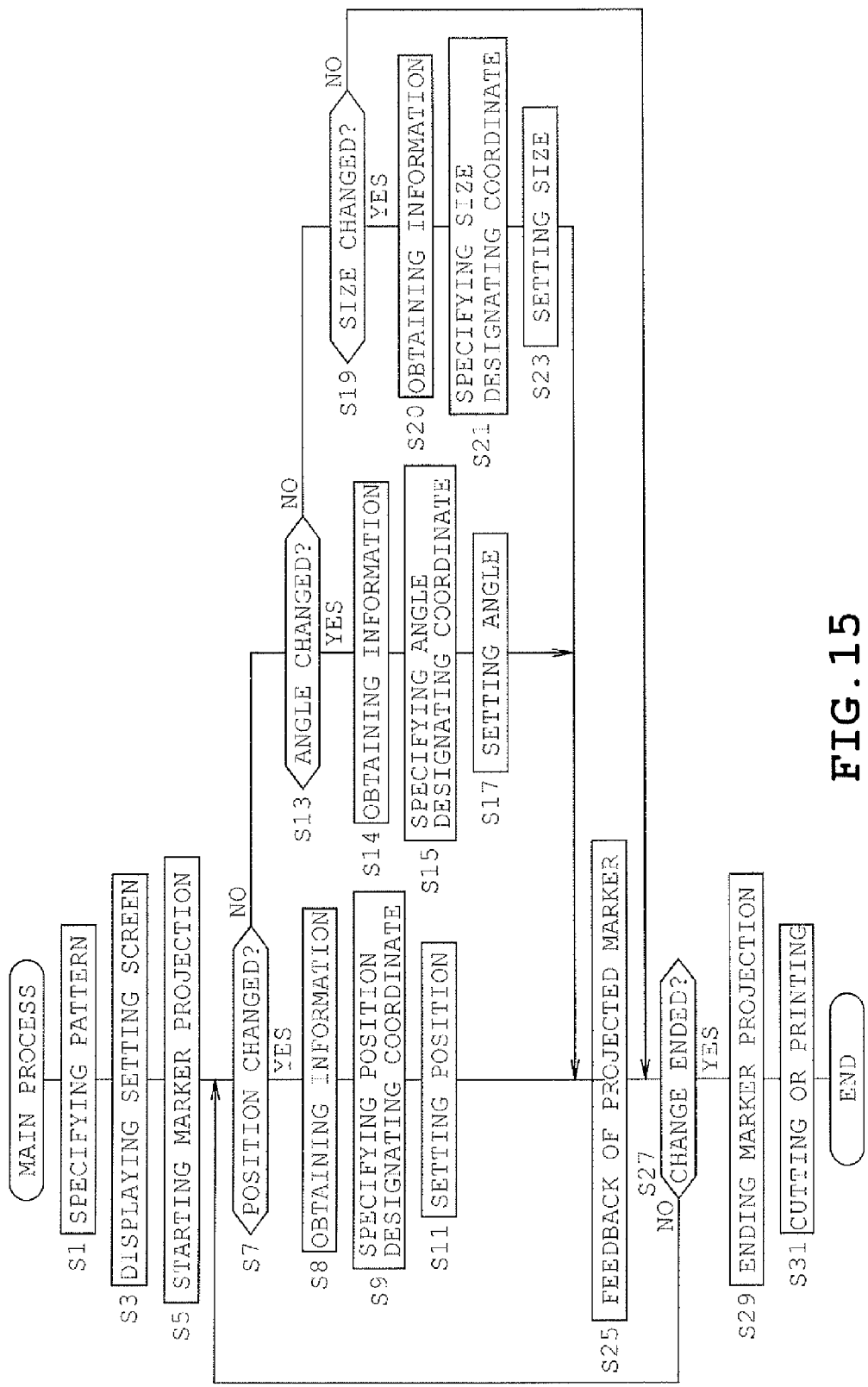
FIG. 15 is a flowchart showing a main processing including setting of processing conditions and a projecting process by a projector.

In changing the size of the pattern A, two of the point blocks 111 to 114 and 130 in the figure group 110 are selected as references. As a result, the control circuit 71 processes two designated coordinates supplied by the operation of the ultrasonic pen 6, as information designating a pair of designated positions defining the size of the pattern. For example, assume that the first and second designated positions 201 and 202 in FIG. 13B are designated by the ultrasonic pen 6 after selection of two diagonally located point blocks 111 and 113. In this case, the pattern A is enlarged so that points W11 and W13 of the rectangular frame W corresponding to the point blocks 111 and 113 correspond with the designated positions 201 and 203, respectively.

Furthermore, in the processing apparatus 1 of the embodiment, the processing position, angle and size of the pattern A can be viewed on the basis of the marker to be projected. When the above-described processing conditions have been changed, the control circuit 71 reflects the changed contents on the marker 100 being projected (see markers 101 to 103 in FIG. 13B).

The processing apparatus 1 constructed as described above will work as follows. Here, a main process will be described with reference to FIG. 15. In the main process, the processing conditions are changed on the basis of the designated coordinate regarding a pattern selected by the user, if necessary, and the processing is executed under the changed processing conditions.

Firstly, the user attaches, for example, a piece of paper as the object S to the holding sheet 10 and sets the holding sheet 10 onto the platen 3 of the processing apparatus 1. As a result, rear corners of the holding sheet 10 are held between the rollers 13a of the pinch roller 13 and the driving roller 12. Thus, the object S on the holding sheet 10 is positioned so as to be substantially horizontal at a predetermined frontward position on the upper surface of the platen 3.

The user further operates the display 9a to display a pattern selection screen (not shown) and selects a desired pattern by a touch operation (step S1). As a result, the control circuit 71 reads the processing data of the selected pattern from the EEPROM 94 to load the data into the RAM 93. The control circuit 71 further causes the display 9a to display the processing condition setting screen 108 (step S3).

The control circuit 71 then generates linage data to project a marker 100 representing the processing conditions based on the processing data of the selected pattern. For example, an initial processing condition of the pattern A is defined by size data and coordinate value data both contained in the processing data, and a coordinate origin W14 of the rectangular frame W corresponds with the origin O of the holding sheet 10 (see FIG. 14). Accordingly, the image data of the marker 100 indicative of the processing condition is generated based on the processing data of the pattern A. An image of the marker 100 based on the image data is projected onto the object S by the projector 67 (step S5).

The marker 100 has, for example, a form representing the figure group 110 as shown in FIG. 13B. More specifically, the marker 100 has an outer frame 100a showing the rectangular frame W which is a processing region and a figure inside the outer frame 100a is a combination of a cross figure 100b and an arrow figure 100c. The marker 100 has a center point which is an intersection 100d of the cross figure 100b and represents the center point of the processing region of the pattern A. A direction of the arrow figure 100c of the marker 100 represents a direction of the initial pattern A and corresponds with a Y-positive direction (the direction in which the object S is moved backward) in the case where an angle of the pattern A is not changed. The marker just needs to be formed so that the processing conditions of the pattern are visible. For example, an image representing a cutting or printing line may be projected as a marker on the basis of display data of the processing data.

The user can thus view the marker 100 on the object S and confirm the set processing conditions. When the pattern A is processed under the initial processing conditions represented by the marker 100, the user touches the OK key 109 on the processing condition setting screen 108 (NO at steps S7, S13 and S19 and YES at step S27). As a result, the pattern A can be cut from or printed on the object S under the initial processing conditions (step S31). The cutting and printing procedures will be described later.

On the other hand, when touching the figure group 110 on the processing condition setting screen, the user can change the initial processing conditions. For example, when the point block 111 of the figure group 110 is touched, the control circuit 71 determines that the processing condition to be changed is the processing position. Subsequently, the control circuit 71 processes the designated coordinate supplied with the use of the ultrasonic pen 6 as information to designate the processing position of the pattern A (YES at step S7).

Consequently, the user can designate the processing position by pressing the pen tip 73a against any position on the object S. In this case, the signal output circuit 74 of the ultrasonic pen 6 supplies an electrical signal via the cable 6a to the control circuit 71 in synchronization with the pressing of the pen tip 73a. Simultaneously, the ultrasonic transmitter 75 transmits ultrasonic waves. When detecting the electrical signal from the signal output circuit 74, the control circuit. 71 obtains the detection time as the transmission timing T1. Furthermore, when the receivers 20b and 20c have defected ultrasonic waves, the control circuit 71 obtains detection times of the receivers 20b and 20c as detection timings T2b and T2c. As a result, the transmission timing T1 and detection timings T2b and T2c are obtained as information indicative of the designated position (step S8).

The control circuit 71 further calculates transmission times Tb and Tc of the receivers 20b and 20c from the timings T1, T2b and T2c. The control circuit 71 then carries out calculation to solve the simultaneous equation of equations (5) and (6), based on the obtained transmission times Tb and Tc and the aforesaid values Xb to Zb, Xc to Zc and V. Further, in consideration of the directionality of the receivers 20b and 20c, the control circuit 71 specifies the coordinate of one designated position from the results of calculation (step S9). In this case, assume that the coordinates of the first and second designated positions 201 and 202 as shown in FIG. 13B have been specified.

In this case, the control circuit 71 converts point W11 of the rectangular frame W corresponding to point block 111 to a coordinate value according to the designated position 201 (see outer frame 101a of FIG. 13B). When a new processing position of the pattern A is set (step S11), the control circuit 71 executes processing to reflect the changed processing position on the marker 100 being projected (step S25). The processing converts the image data of the marker 100 to image data of a marker 101 in which a corner of the outer frame 101a corresponds with the designated position 201. A known conversion method is applicable to the above-described coordinate conversion of the processing data and the coordinate conversion of the image data. In these coordinate conversions, parallel translation is carried out while X-difference and Y-difference between the point W11 of the rectangular frame W and the designated position serve as amounts of movement. As a result, the changed processing position set by the ultrasonic pen 6 is at once fed back to the marker 100 being projected on the object S, whereby the changed marker 101 is projected. Accordingly, the changed processing position can be grasped directly and accurately from the marker 101 on the object S.

Assume now that the user touches the side block 121 of the figure group 110 on the processing condition setting screen 108 without touching the OK key 109 (NO at step S27). In this case, the control circuit 71 determines that the processing condition to be changed is an angle of the pattern A (NO at step S7 and YES at step S13). The control circuit 71 subsequently processes two designated coordinates supplied from the ultrasonic pen 6 as information of the first and second designated positions to set the angle of the pattern A.

Assume that two positions 201 and 202 on the object S as shown in FIG. 13B are designated in turn by the operation of the ultrasonic pen 6 (step S14). In this case, the pattern A is changed from the initial direction in which the sides of the rectangular frame of the pattern A are parallel to sides of the holding sheet 10 (see the outer frame 101a in FIG. 13B), as follows. More specifically, the control circuit 71 executes the same calculation as at step S9, with respect to two designated positions, thereby specifying the coordinates of the first and second designated positions (step S15). The control circuit 71 then calculates an angle made by an imaginary line passing the specified positions 201 and 202 and the side W21 (see FIG. 11) of the rectangular frame W corresponding to the side block 121 (step S17).

The control circuit 71 then converts the processing data of pattern A to a coordinate value obtained by turning the pattern A about the designated position 201 by the calculated angle, whereby the processing region of the pattern A is turned so that vector obtained by moving a point from the first designated position 201 to the second designated position corresponds with vector obtained by moving a point from the point W11 of the first rectangular frame to the point W12 (see the outer frame 102e in FIG. 13B). Furthermore, the control circuit 71 executes processing to reflect the angle calculated at step S17 on the marker 101 being projected (step S25). The above-described processing converts the image data of the marker 101 to image data of a marker 102 reflecting the angle of the changed pattern A. Thus, the marker 102 reflecting the angle of the changed pattern A is projected onto the object S. The processing region of the tilted pattern A can be discriminated by the projected marker 102.

Further, assume that the user touches two point blocks 111 and 113 of the figure group 110 without operation of the OK key 109 (NO at step S27) on the processing condition setting screen 108. In this case, the control circuit 71 determines that the processing condition to be changed is the size of pattern A (NO at steps S7 and S13 and YES at step S19). The control circuit 71 subsequently processes two designated coordinates supplied by the ultrasonic pen 6 as information about first and second designated positions to set the size of pattern A.

More specifically, assume that the user operates the ultrasonic pen 6 to designate two points 201 and 203 on the object S in turn as shown in FIG. 13B (step S20). In this case, the control circuit 71 carries out the same calculation regarding two designated positions as at step S9 to specify the coordinates of the first and second designated positions 201 and 203 (step S21). With respect to the processing data of the pattern A, the control circuit 71 converts the points W11 and W13 of the rectangular frame W corresponding to point blocks 111 and 113 to coordinate values enlarged so that the points W11 and W13 correspond with the designated positions 201 and 203 respectively (step S23). Further, the control circuit 71 executes processing to reflect the changed size of the pattern A to the marker 102 being displayed (step S25). As the result of the processing, image data of the marker 102 is converted to image data of the marker 103 according to the size of the changed pattern A. Thus, the marker 103 reflecting the changed size of the pattern A is projected onto the object S. The size of the processing region of the pattern A can be discriminated by the projected marker 103.

The above-described steps S7 to S25 can be executed repeatedly unless the OK key 109 is selected (NO at step S27), whereby the processing conditions of pattern A, that is, the processing position, angle and size of the pattern A can be set to respective desirable values. When the OK key 109 is then selected (YES at step S27), the projector 67 finishes projection of the marker (step S29).

The pattern A is cut out of or printed on the object S at step S31. In this case, the user causes the display 9*a* to display the processing start screen (not shown), touching a "cutting start" key on the screen. When determining that the cutter cartridge 4*c* has been attached, based on detection signals of the type detection sensors 63A to 63C, the control circuit 71 executes the cutting of the pattern A based on the cutting data of the pattern A. As a result, the pattern A is cut out of the object S on the processing conditions indicated by the marker having been projected immediately before the cutting, whereby the pattern A or the rhombus can be cut by the cutter 44.

On the other hand, when a "printing start" key (not shown) is touched on the processing start screen, the control circuit 71 determines whether or not the pen cartridge 4*p* has been attached, based on the detection signals of the type detection sensors 63A to 63C. When determining that the pen cartridge 4*p* has been attached, the control circuit 71 executes the printing based on the printing data of pattern A. As a result, the pattern A is printed on the object S on the processing conditions indicated by the marker having been projected immediately before the printing, whereby the pattern A or the rhombus can be drawn by the pen cartridge 4*p*.

Upon completion of the processing of the object S, the holding sheet 10 is transferred forward by the transfer mechanism 7 to be discharged, whereby a sequence of processing is completed (END).

An information obtaining unit which obtains information about processing of the object S is constituted by the control circuit 71 executing steps S1, S8, S14 and S20 and the receivers 20*b* and 20*c* as information obtaining devices. The control circuit 71 executing steps S9, S15 and S21 functions as a position specifying unit which specifies the position on the object S. A projection unit is constituted by the control circuit 71 executing steps S5 and S25 and the projector 67 serving as a projection device.

As described above, the processing apparatus 1 according to the embodiment includes the projection unit which projects the visible marker onto the object S based on the position on the object S specified by the position specifying unit. The processing apparatus 1 is configured to be capable of discriminating the position related with the processing of the object S.

According to the aforesaid construction and arrangement, the visible marker is projected onto the object S by the projection unit based on the position on the object S specified by the position specifying unit. Accordingly, the position related with the processing is directly viewed on the basis of the marker projected onto the object S with the result that an accurate position on the object S can be understood.

The control circuit 71 has the function as a pattern specifying unit (see step S1) which specifies a pattern together with the display 9*a* as the pattern specifying device and the touch panel 9*c*. Further, the control circuit 71 has the function of a setting unit (steps S11, S17 and S23) which sets the processing condition to process the pattern specified by the pattern specifying unit based on the position on the object S specified by the position specifying unit. The control circuit 71 is configured to control the processing device based on the processing condition set by the setting unit, thereby processing the pattern on the object S.

The projection unit projects the marker representing the processing condition set by the setting unit, onto the object S. As a result, the processing condition of the concrete pattern specified in the processing apparatus 1 can be confirmed directly and easily.

The information obtaining unit obtains information representing the designated position optionally designated with respect to the position on the object S. The position specifying unit specifies the designated position on the object S based on the information obtained by the information obtaining unit. The setting unit sets the designated position specified by the position specifying unit to the processing position of the pattern.

According to the aforesaid construction and arrangement, the user designates the position on the object S while expecting the finished pattern on the object S, whereby the user can set the processing position of the pattern. Further, both the designated position and the marker representing the processing position of the pattern are on the object S. Accordingly, the processing position can be designated easily and accurately, and the set processing position can be confirmed easily.

When a plurality of designated positions is specified by the position specifying unit, the setting unit sets the processing position of the pattern as the processing condition and also sets at least one of an angle and size of the pattern.

According to the aforesaid configuration, for example, when two positions are designated on the object S, an inclination of the straight line passing both designated positions can be set as an angle of the pattern by the setting unit. Accordingly, when the object S has a vertically-striped pattern and the user wishes to arrange a pattern along the vertically-striped pattern, an angle of the pattern can be set by an easy operation of designating two points specifying the straight line extending along the vertically-striped pattern. On the other hand, for example, when two positions are designated on the object S, the size of the pattern can be set by the setting unit so as to correspond to a distance (the length of line segment) between the two designated positions. Thus, the angle and size of the pattern can be set by an easy operation as well as the processing position of the pattern by specifying a plurality of designated positions on the object S, with the result that the usability of the processing apparatus can be improved.

When a plurality of types of processing conditions is set by the setting unit, the projection unit projects markers representing the processing conditions onto the object S. According to this configuration, setting status of the plurality of processing conditions can be easily grasped on the object S by the markers.

When the position on the object S specified by the position specifying unit is changed, the setting unit resets the processing condition based on the changed position. The projection unit projects onto the object S a marker representing the processing condition reset by the setting unit. According to this configuration, for example, the user can fine-tune processing conditions of the pattern while viewing the reset marker, with the result that a desired processing condition can be easily set.

The information obtaining unit includes the detection device which detects ultrasonic waves transmitted from the position on the object S. The position specifying unit is configured to specify a source to transmit the ultrasonic waves based on the detection of ultrasonic waves by the detection device, thereby specifying the position on the object S. According to this configuration, the user can designate a position on the object S by an ultrasonic transmission unit such as the ultrasonic pen 6. Further, the designated position can be specified accurately although the ultrasonic detection device and the position specifying unit are cost-effective and configured in a simple manner, with the result that the ultrasonic detection device and the position specifying unit can be rendered practically suitable.

The processing device includes the cutting unit which cuts the pattern out of the object S. As a result, the position designated on the object S can be set as the cutting position and the pattern can be cut out of the object S.

The processing device includes the printing device which prints the pattern on the object S. As a result, the position designated on the object S can be set as the printing position and the pattern can be printed on the object S.

The processing apparatus 1 is configured to designate a type of the processing condition or a reference portion on the setting screen 108 in order that a plurality of types of processing conditions may be set based on the designated positions. According to this configuration, a plurality of types of processing conditions can be set easily by designating the position on the object S and operation on the setting screen 108. As a result, the usability of the processing apparatus 1 can be improved.

The processing apparatus 1 is configured to designate the type of the processing condition or the reference portion on the setting screen 108 in order that a plurality of types of processing conditions may be set on the basis of the designated position. According to this configuration, a plurality of processing conditions can be set easily by the designation of the position on the object S and operation on the setting screen, with the result that the usability of the processing apparatus 1 can be improved.

A second embodiment will be described in the following. Identical or similar parts are labeled by the same reference numerals as those in the foregoing embodiment and the description of these parts will be eliminated. Only the differences from the foregoing embodiment will be described.

The control circuit 71 in the second embodiment is configured to set the type of processing condition to be changed, according to the number of designated positions to be designated during a predetermined period (30 seconds, for example).

For example, when one position is designated on the object S by the operation of the ultrasonic pen 6 within 30 seconds starting from initiation of projection of the marker 100 at step S5, a processing position of the pattern is set on the designated position. When two positions are designated within the aforesaid 30 seconds, a processing position and an angle of the pattern are set while the designated positions serve as first and second designated positions in the order of input. Further, when three positions are designated within the aforesaid 30 seconds, a processing position, angle and size of the pattern are set while the designated positions serve as first, second and third designated positions in the order of input. Thus, in the second embodiment, the angle of the pattern is specified on the basis of the first and second designated positions, and the size of the pattern is specified on the basis of the first, second and third positions.

The marker 100 in FIG. 13B represents an initial processing condition. A main process will be described in the case where the initial processing condition is changed to a processing condition indicated by a marker 103 with further reference to FIG. 15. In the following description, the differences between the first and second embodiments will be described.

In the second embodiment, point W11 of the rectangular frame W corresponding to point block 111 is set as a reference of the processing position of the pattern. Side W21 of the rectangular frame W corresponding to side block 121 is set as a reference of the angle of the pattern. Points W11 and W13 of the rectangular frame W corresponding to point blocks 111 and 113 are set as a reference of the size of the pattern respectively. These references are initially set and may be optionally changed with priority being given to user's designation.

Assume now that the ultrasonic pen 6 is operated to designate three designated positions within 30 seconds starting from initiation of projection of marker 100 at step S5. In this case, when positions 201, 202 and 203 in FIG. 13B are designated in this order, the control circuit 71 specifies coordinates of the first, second and third designated positions 201, 202 and 203. More specifically, when detecting information about the position 201 on the object S by the ultrasonic pen 6 (YES at step S7; and step S8), the control circuit 71 specifies the coordinates of the first designated position 201 based on the information (step S9). Further, the point W11 of the rectangular frame W is changed to a coordinate value such that the point W11 corresponds with the specified first designated position 201 with respect to processing data of pattern A (see FIG. 11 and the outer frame 101a in FIG. 13B). When a new processing position of the pattern A is set (step S11), the control circuit 71 changes the marker 100 to a new marker 101 to be projected to a new processing position (step S25), returning to step S7 (NO at step S27).

Since the processing position as the processing condition has already been changed (NO at step S7), the angle of the pattern A is changed on the basis of the first and second designated positions (YES at step S13). In this case, the control circuit 71 specifies coordinates of the first and second designated positions 201 and 202 and calculates an angle made between an imaginary line passing the designated positions 201 and 202 and the side W21 of the rectangular frame W (steps S14 and S15). Further, the control circuit 71 converts the processing data of pattern A into a coordinate value obtained by turning the pattern A about the designated position 201 by the calculated angle (step S17). As a result, the processing region of pattern A is turned so that a vector obtained by moving a point from the first designated position 201 to the second designated position 202 corresponds with a vector obtained by moving a point from the point W11 of the rectangular frame W to the point W12 (see outer frame 102a in FIG. 13B). When the angle of the pattern A is thus set, the control circuit 71 changes the marker 101 being projected to a marker 102 set to the new angle (step S25), returning to step S7 (NO at step S27).

Since the processing position and the angle of the pattern A as the processing conditions have already been changed (NO at steps S7 and S13), the size of the pattern A is changed on the basis of the first and third designated positions (YES at step S19). In this case, the control circuit 71 specifies coordinates of the designated positions 201 and 203 (steps S20 and S21). The processing data of pattern A is converted to coordinate values obtained by enlarging the pattern A so that an imaginary line connecting between the designated positions 201 and 203 corresponds with a diagonal line connecting between the points W11 and W13 (step S23). When the size of the pattern A is thus set, the marker 102 being projected is changed to a marker 103 set to a new size (step S25).

Subsequently, when the OK key 109 is operated on the processing condition setting screen 108 (YES at step S27), the projection of the marker 103 is finished and the pattern A is cut out of the object S or printed on the object S (step S29 or S31). When there is no input of designated position within the predetermined time (NO at steps S7, S13 and S19) and the OK key 109 is selected (YES at step S27), the projection is finished without change of the initial marker 100 (step S29). In this case, the pattern A is cut out of or printed on the object S on the initial processing conditions indicated by the marker 100 based on the original processing data (step S31).

According to the second embodiment, the control circuit 71 is configured to determine the type of the processing condition based on the number of designated positions. This can avoid the troublesome setting of processing conditions by the touch operation on the processing condition setting screen 108 (figure group 110). Further, a plurality of types of processing conditions can be set at once by a sequence of operations to designate a plurality of designated positions, with the result that the usability of the processing apparatus 1 can be improved. Additionally, the markers 100 to 103 indicative of a plurality of types of processing conditions can be projected onto the object S, and other advantageous effects can be achieved and accordingly, the second embodiment can achieve the same advantageous effects as the first embodiment.

The processing apparatus 1 should not be limited to the above-described embodiments and may be modified or expanded as follows.

(A) The construction and configuration of the processing apparatus 1 may be changed appropriately. The processing apparatus should not be limited to the cutting plotter but may be a cutting device having a main cutting function or a printing device having a main printing function. Further, the object S may be only cut table and/or printable and may be cloth or resin sheet. The device designating any position on the object S (the position obtaining device) may be a separate device such as the ultrasonic pen 6 or the position obtaining device may be provided integrally with the processing apparatus.

(B) The information about the designated positions and the manner of obtaining the information may be changed appropriately. The manner of specifying the designated position may be changed according to the information. For example, information about the designated position may be obtained from image data of an imaging device such as an image sensor, and the coordinate of the designated position may be specified on the basis of the image data. Known methods may be usable as image processing including a method of specifying a predetermined position (designated position) on the basis of the image data. Accordingly, detailed description of the image processing will be eliminated. Further, a pointing device such as a pen tablet may be used as the position obtaining device to designate the designated position. When the ultrasonic pen is used to detect the designated position, the time detected from three or more receivers may be obtained as the information presenting the designated position. In this case, the designated position can be specified based on simultaneous equations including equations whose number is equal to the number of the receivers and the directionalities of the receivers, in the same manner as the above-described equations (5) and (6). Additionally, information indicative of the designated positions may be obtained by wireless.

(C) The design, shape, size of the marker, and the like may be changed appropriately in consideration of the processing condition indicated by the marker. For example, when a marker indicates a processing position, the marker may be a cross-shaped pattern, round, star-shaped or the like. The marker may indicate any contents other than the processing conditions of the pattern. For example, the marker may indicate information to correct the projector 67. More specifically, the adjustment unit or the support device 84 may be adjusted or so that a marker is projected to the position designated by the ultrasonic pen 6, or a process of compensating parameters used in generation of image data may be executed. When a plurality of types of processing conditions is set on the basis of the designated position, the markers may not indicate the plurality of types of conditions respectively. For example, when a processing position, angle and size are set as processing conditions of a pattern, the marker may indicate only the size of the pattern. Further, as described above, an image representing a cutting line or printing line may be projected as a marker based on display data of the processing data.

(D) The projection unit which projects a marker should not be limited to the above-described projector 67 but may be changed appropriately. For example, the projection unit may include at least one of a laser line marker and a laser pointer. The projection unit may be provided integrally with the processing apparatus 1 or may be provided individually of the apparatus 1 so as to be detachable attachable to the apparatus 1. Further, the projection unit may be configured so that a mounting position on the processing apparatus 1 may be changeable and a range of projection of the projection unit may be changed appropriately. For example, the control circuit 71 may automatically set the size of a pattern based on the coordinate of the designated position. In this case, since the processing position of the pattern need not be indicated by a marker, the projection range of the projection unit need not include the cuttable region (the adhesive layer 10v) of the holding sheet 10. In the foregoing embodiments, the projector 67 reflects the changed contents on the marker being projected every time the processing condition is changed. However, the projector 67 should not be limited to this operation mode. For example, the processing apparatus 1 may reflect the changed contents on the marker being projected only when receiving the instruction to reflect the changed contents from the user. Further, the processing apparatus 1 of the second embodiment may change the marker into one reflecting all the set processing conditions at one time when two or more designated positions are designated by the aforementioned sequence of operation, or the processing apparatus 1 may change the marker every time setting a new processing condition. The coordinate origin W14 or the center of the frame W (the center point block 130) may be designated as a reference of processing position.

(E) A manner of setting processing conditions of a pattern maybe changed appropriately on the basis of a designated position. For example, when the processing conditions are set on the basis of the designated position, the pattern may be arranged so that a reference point thereof corresponds with the coordinate of a middle point between two designated positions. Further, all the processing conditions of the processing position, angle and size of the pattern may be set in the following manner on the basis of two designated positions. In this case, the control circuit 71 sets the processing position of the pattern based on the coordinate of one of the designated positions, for example. The angle of the pattern is set on the basis of a direction of the vector obtained by moving a point from one designated position to the other designated position. The size of the pattern is set on the basis of a length of the line connecting between thus obtained two designated positions. Further, in the processing apparatus capable of setting a plurality of types of processing conditions, the above-described processing manner of setting all the processing conditions on the basis of two designated position may be applied to the process of setting a single processing condition on the basis of a single designated position in the first embodiment and to the process of setting a plurality of types of processing conditions on the basis of a single designated position in the second embodiment.

The main processing in the first embodiment may be combined with the main processing in the second embodiment. In this case, two modes are available. In one mode, a plurality of processing conditions is changeable at one time on the basis of a plurality of designated positions. In the other mode, only a specific processing condition is changeable. These modes may be selectable. As a result, the user roughly designates a plurality of processing conditions by changing the processing conditions at one time on the basis of the plurality of designated positions. Thereafter, the user changes only the specific processing condition, whereby fine control of the processing condition can be carried out. Further, when the processing conditions are set based on a plurality of designated positions, at least one of the angle and size of the pattern may be set in addition to the processing position. For example, the processing position and size of the pattern may be set based on two designated positions. Further, the processing apparatus 1 may not receive the above-described reset processing conditions. In this case, when determining at step S27 in FIG. 15 that the processing condition setting process has been completed (YES), the control circuit 71 executes processing at step S29. When a plurality of processing conditions is set based on a plurality of designated positions, what one of the plurality of processing conditions should be set on the basis of the plurality of designated positions may be determined appropriately. The processing conditions of the pattern may be conditions other than the processing position, angle and size. For example, a deformation amount of the pattern may be set as a processing condition of the pattern based on the designated position.

Although a main processing program (a data processing program) is stored in a storage unit of the processing apparatus 1, the program may be stored in a non-transitory computer-readable storage medium including a USB memory, CD-ROM, flexible disc, DVD and flash memory. In this case, the data processing program stored in the storage medium is read by computers of various types of processing apparatuses provided with a cutting device and/or a printing device thereby to be executed. This can achieve the same effect as the above-described example.

In the above-described embodiments, single CPU may perform all of the processes. Nevertheless, the disclosure may not be limited to the specific embodiment thereof, and a plurality of CPUs. A special application specific integrated circuit ("ASIC"), or a combination of a CPU and an ASIC may be used to perform the processes.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

We claim:

1. An apparatus comprising:
   a pattern specifying device configured to specify a pattern to be cut out of an object or to be printed on the object;
   a projector configured to project a marker onto the object, the marker corresponding to the specified pattern;
   a processing device configured to cut the object or print on the object based on the specified pattern;
   an information obtaining device configured to obtain information representing an optionally designated position on the object; and
   a control device configured to cause the apparatus to:
   specify two designated positions of the marker projected onto the object, based on the information obtained by the information obtaining device;
   change a size of the specified pattern according to a distance between the two specified designated positions of the marker projected onto the object;
   cause the projector to project the marker onto the object in a size matched with the changed size of the pattern, based on the two specified designated positions of the marker projected onto the object; and
   control the processing device to cut the object or print on the object based on the specified pattern with the changed size.

2. The apparatus according to claim 1, further comprising a unit configured to receive an operation input for selecting a size or an angle when the size or the angle of the pattern is changed, wherein the control device is configured to further cause the apparatus to:
   calculate an angle to which the specified pattern is to be changed, based on the two specified designated positions, and rotate the pattern about either one of the two specified designated positions with the calculated angle serving as an amount of displacement, when the unit has received selection of the angle of the pattern;
   cause the projector to project the marker onto the object at an angle matched with the angle of the rotated pattern, based on the two specified designated positions on the object: and
   control the processing device to cut or print the rotated pattern.

3. The apparatus according to claim 2, wherein the control device is configured to further cause the apparatus to specify a rectangular frame encompassing the pattern specified by the pattern specifying device and changing the size of the pattern so that two of apexes of the rectangular frame correspond to the respective specified designated positions, when the receiving unit has received selection of the size of the pattern.

4. The apparatus according to claim 1, wherein when another designated position has been specified on the object while the projector is projecting the marker onto the object, the control device is configured to further cause the apparatus to display the marker at the another specified designated position.

5. The apparatus according to claim 1, wherein the information obtaining device includes a detection device configured to detect ultrasonic waves transmitted from the two specified designated positions on the object, and wherein the control device is configured to further cause the apparatus to:
specify transmission locations of the ultrasonic waves based on detection of the ultrasonic waves, thereby specifying the two designated positions on the object.

6. The apparatus according to claim 1, wherein the control device is configured to further cause the apparatus to specify a rectangular frame encompassing the pattern specified by the pattern specifying device and changing the size of the pattern so that two of apexes of the rectangular frame correspond to the respective specified designated positions.

7. A non-transitory computer-readable medium for an apparatus comprising:
a pattern specifying device configured to specify a pattern to be cut out of an object or to be printed on the object;
a projector configured to project a marker onto the object, the marker corresponding to the specified pattern;
a processing device configured to cut the object or print on the object based on the specified pattern;
an information obtaining device configured to obtain information representing an optionally designated position on the object; and
a control device storing computer-readable instructions, which, when executed by the control device, cause the apparatus to:
specify two designated positions of the marker projected onto the object, based on the information obtained by the information obtaining device;
change a size of the specified pattern according to a distance between the two specified designated positions of the marker projected onto the object;
cause the projector to project the marker onto the object in a size matched with the changed size of the pattern, based on the two specified designated positions of the marker projected onto the object; and
control the processing device to cut the object or print on the object based on the specified pattern with the changed size.

8. The medium according to claim 7, wherein the apparatus further comprises a unit configured to receive and operation input for selecting a size or an angle when the size or the angle of the pattern is changed, wherein the instructions, when executed by the control device, further cause the apparatus to:
calculate an angle to which the specified pattern is to be changed, based on the two specified designated positions, when the receiving unit has received selection of the angle of the pattern, and rotate the pattern about either one of the two specified designated positions with the calculated angle serving as an amount of displacement;
cause the projector to project the marker onto the object at an angle matched with the angle of the rotated pattern, based on the two specified designated positions on the object; and
control the processing device to cut or print the rotated pattern.

9. The medium according to claim 8 wherein the instructions, when executed by the control device, further cause the apparatus to specify a rectangular frame encompassing the pattern specified by the pattern specifying device and changing the size of the pattern so that two of apexes of the rectangular frame correspond to the respective specified designated positions, when the receiving unit has received selection of the size of the pattern.

10. The medium according to claim 7, wherein when another designated position has been specified on the object while the projector is projecting the marker onto the object, the instructions, when executed by the processor, further cause the apparatus to display the marker at the another specified designated position.

11. The medium according to claim 7, wherein the information obtaining device includes a detection device configured to detect ultrasonic waves transmitted from the two specified designated positions on the object,
wherein the instructions, when executed by the control device, further cause the apparatus to:
specify transmission locations of the ultrasonic waves based on detection of the ultrasonic waves, thereby specifying the two designated positions on the object.

12. The medium according to claim 7, wherein the instructions, when executed by the control device, further cause the apparatus to specify a rectangular frame encompassing the pattern specified by the pattern specifying device and changing the size of the pattern so that two of apexes of the rectangular frame correspond to the respective specified designated positions.

* * * * *